(12) United States Patent
Ta et al.

(10) Patent No.: US 11,598,859 B2
(45) Date of Patent: Mar. 7, 2023

(54) ELECTRONIC APPARATUS AND METHOD

(71) Applicant: KABUSHIKI KAISHA TOSHIBA, Minato-ku (JP)

(72) Inventors: Tuan Thanh Ta, Kawasaki (JP); Hidenori Okuni, Yokohama (JP); Satoshi Kondo, Kawasaki (JP); Akihide Sai, Yokohama (JP); Toshiki Sugimoto, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 753 days.

(21) Appl. No.: 16/564,818

(22) Filed: Sep. 9, 2019

(65) Prior Publication Data

US 2020/0300987 A1    Sep. 24, 2020

(30) Foreign Application Priority Data

Mar. 18, 2019 (JP) .............................. JP2019-050179

(51) Int. Cl.
*G01S 7/00* (2006.01)
*G01S 7/4865* (2020.01)
*G01S 17/10* (2020.01)

(52) U.S. Cl.
CPC ............ *G01S 7/4865* (2013.01); *G01S 17/10* (2013.01)

(58) Field of Classification Search
USPC ....................................................... 356/5.01
See application file for complete search history.

(56) References Cited

U.S. PATENT DOCUMENTS

| 6,934,012 B2 * | 8/2005 | Inaba ...................... G01S 17/18 356/5.03 |
| 8,362,890 B2 * | 1/2013 | Takeichi ............... G01S 15/931 340/435 |
| 10,852,401 B2 * | 12/2020 | Koyama ............... G01S 7/4865 |
| 2004/0070748 A1 * | 4/2004 | Inaba ...................... G01S 17/10 356/5.01 |

(Continued)

FOREIGN PATENT DOCUMENTS

| JP | 5-52956 A | 3/1993 |
| JP | 2003-255046 A | 9/2003 |

(Continued)

*Primary Examiner* — James R Hulka
(74) *Attorney, Agent, or Firm* — Oblon, McClelland, Maier & Neustadt, L.L.P.

(57) ABSTRACT

An electronic apparatus capable of determining a distance to an object based on at least first reflected light provided by a reflection of first pulsed light on the object and second reflected light provided by a reflection of a second pulsed light on the object has an input terminal to receive an electrical signal of intensity of reception light, and processing circuitry to specify, based on the electrical signal, a first duration from when the first pulsed light is emitted until when the first reflected light is received within a first measurement range, and determine, based on the first duration, a second measurement range of the second reflected light, specify, a second duration from when the second pulsed light is emitted until when the second reflected light is received within the second measurement range, and determine the distance from the electronic apparatus to the object.

22 Claims, 23 Drawing Sheets

(56) References Cited

U.S. PATENT DOCUMENTS

| | | | | |
|---|---|---|---|---|
| 2010/0066534 | A1* | 3/2010 | Takeichi | G01S 7/527 |
| | | | | 340/540 |
| 2011/0058167 | A1* | 3/2011 | Knox | H04N 7/18 |
| | | | | 356/338 |
| 2016/0200161 | A1* | 7/2016 | Van Den Bossche | G01S 17/89 |
| | | | | 250/206 |
| 2016/0282468 | A1* | 9/2016 | Gruver | G01S 7/4813 |
| 2017/0242108 | A1* | 8/2017 | Dussan | G01S 7/4868 |
| 2018/0164410 | A1 | 6/2018 | Gnecchi et al. | |
| 2018/0238999 | A1 | 8/2018 | Koyama et al. | |
| 2018/0247968 | A1* | 8/2018 | Na | H01L 27/14634 |
| 2018/0259629 | A1* | 9/2018 | Oohata | G01S 17/10 |
| 2018/0284244 | A1* | 10/2018 | Russell | G01S 7/484 |
| 2018/0284247 | A1* | 10/2018 | Campbell | G01S 17/10 |
| 2018/0284279 | A1* | 10/2018 | Campbell | G01S 7/4816 |
| 2018/0306926 | A1* | 10/2018 | LaChapelle | G01J 1/44 |
| 2019/0086545 | A1* | 3/2019 | Mooney | G01S 17/88 |
| 2020/0025894 | A1* | 1/2020 | Van Dyck | G01S 17/931 |
| 2020/0033456 | A1* | 1/2020 | Wang | H04N 9/045 |
| 2020/0124726 | A1* | 4/2020 | Geuens | G01S 7/4865 |
| 2020/0137330 | A1* | 4/2020 | Van Dyck | G01S 7/4863 |
| 2020/0284883 | A1* | 9/2020 | Ferreira | G01S 7/4817 |
| 2020/0300988 | A1* | 9/2020 | Okuni | G01S 7/4873 |

FOREIGN PATENT DOCUMENTS

| | | |
|---|---|---|
| JP | 2007-225342 A | 9/2007 |
| JP | 2009-276248 A | 11/2009 |
| JP | 2013-19684 A | 1/2013 |
| JP | WO 2017/037968 A1 | 3/2017 |
| JP | 2018-40656 A | 3/2018 |

* cited by examiner

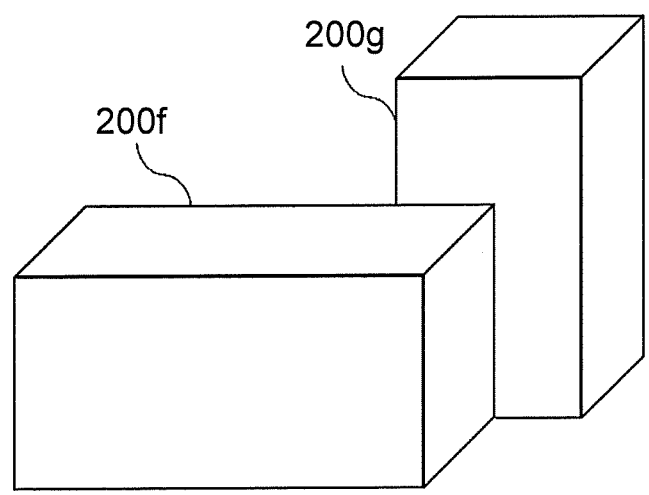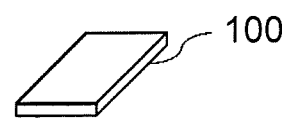
FIG.18

ELECTRONIC APPARATUS AND METHOD

CROSS REFERENCE TO RELATED APPLICATIONS

This application is based upon and claims the benefit of priority from the prior Japanese Patent Application No. 2019-50179, filed on Mar. 18, 2019, the entire contents of which are incorporated herein by reference.

FIELD

Embodiments of the present invention relate to an electronic apparatus and a method for measuring distance.

BACKGROUND

There has been developed an electronic apparatus that measures, using a time from emission of light to reception of reflected light reflected by an object, a distance to the object. An electronic apparatus capable of suppressing influence of reflectivity of an object subject to distance measurement and ambient light and improving accuracy of distance measurement is desired.

BRIEF DESCRIPTION OF THE DRAWINGS

FIG. 18 is a diagram for illustrating arrangement of objects in three dimensions;

DETAILED DESCRIPTION

According to an embodiment of the present disclosure, an electronic apparatus capable of determining a distance to an object based on at least first reflected light provided by a reflection of first pulsed light on the object and second reflected light provided by a reflection of a second pulsed light on the object has an input terminal configured to receive an electrical signal of intensity of reception light, processing circuitry configured to specify, based on the electrical signal, a first duration from when the first pulsed light is emitted until when the first reflected light is received within a first measurement range, and determine, based on the first duration, a second measurement range of the second reflected light, specify, based on the electrical signal, a second duration from when the second pulsed light is emitted until when the second reflected light is received within the second measurement range, and determine the distance from the electronic apparatus to the object according to the second duration.

Hereinafter, embodiments for carrying out the invention will be described.

First Embodiment

Figure 1:
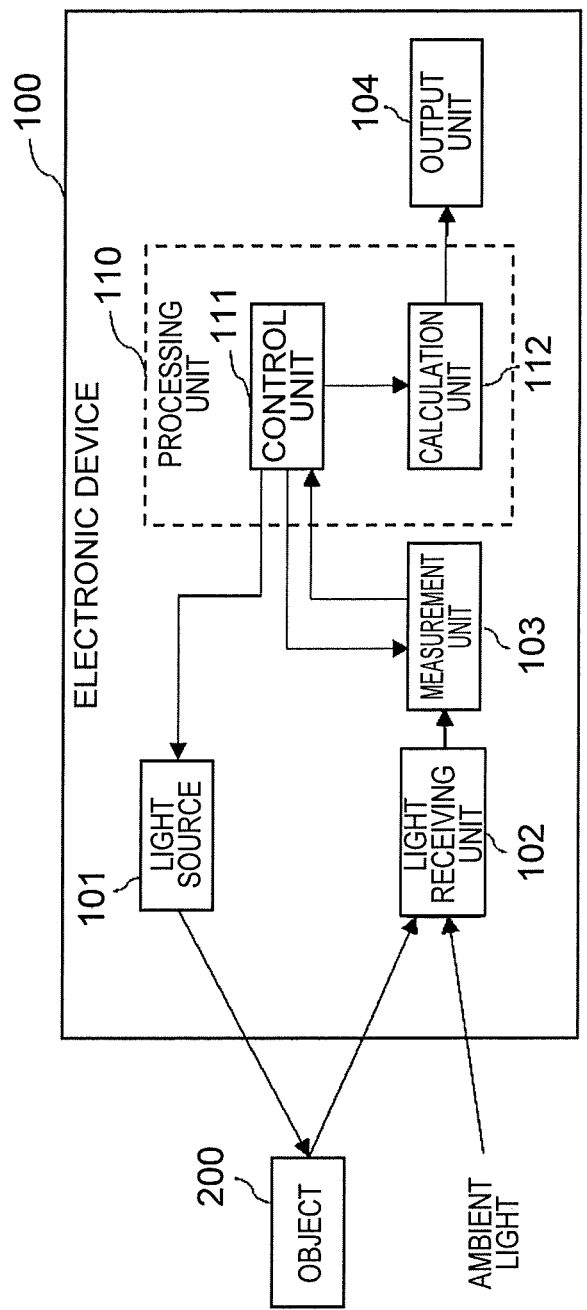
FIG. 1 is a diagram of a distance measurement system including a configuration of an electronic apparatus according to a first embodiment.

FIG. 1 illustrates a distance measurement system according to the present embodiment. In the distance measurement system, an electronic apparatus (electronic device) 100 is an electronic apparatus that measures a distance to an object 200.

The electronic apparatus 100 includes a light source 101 and a light receiving unit 102. The light source 101 emits an electromagnetic wave having a duration of time to the object 200. The duration of time will be hereinafter referred to as a pulse width, and the electromagnetic wave will be hereinafter referred to as pulsed light. The pulsed light is reflected by the object 200, and a part (hereinafter also referred to as reflected light) of the reflected pulsed light is partially received by the light receiving unit 102. The electronic apparatus 100 measures a time (time of flight: hereinafter also referred to as ToF) from the emission of the pulsed light to the reception of the reflected light.

On the basis of the ToF, the electronic apparatus 100 calculates a distance d between the electronic apparatus 100 and the object 200 according to the following formula (1).

[Formula 1]

$$d = \frac{ToF}{2} \cdot c \qquad (1)$$

Here, c represents the speed of light (approximately $3 \times 10^8$ m/s).

Accuracy of the ToF needs to be improved to improve accuracy of the distance d. However, as illustrated in FIG. 1, the electronic apparatus 100 also receives light other than the reflected light. That is, for example, light (lighting or lighting of a lamp) emitted by a device other than the electronic apparatus 100, light derived from sunlight, and the like. Hereinafter, the light other than the reflected light will be referred to as ambient light.

The influence of the ambient light needs to be reduced to improve the accuracy of the ToF. The electronic apparatus 100 according to the present embodiment emits pulsed light to the object 200, and first measures ToF that is a time until detecting the reflected light from the object 200 once. On the basis of the calculated ToF, the electronic apparatus 100 determines a time range (hereinafter referred to as a measurement range) in which ToF is measured for the second time and a threshold value for determining as reflected light.

Thereafter, pulsed light is emitted to the object 200 again, and ToF is measured again. The electronic apparatus 100 calculates the distance d on the basis of the re-measured ToF. Accordingly, the electronic apparatus 100 can determine the reflected light while reducing the influence of the ambient light, whereby the accuracy of ToF can be improved. In other words, the electronic apparatus 100 is capable of calculating the distance d highly accurately.

The electronic apparatus 100 includes, in addition to the light source 101 and the light receiving unit 102, a measurement unit 103, an output unit 104, a control unit 111, and a calculation unit 112. Note that the control unit 111 and the calculation unit 112 are included in a processing unit (processing circuitry) 110.

The light source 101 is a device that receives a command from the control unit 111 and emits pulsed light to the object 200. For example, the light source 101 may be a combination of a laser light source, such as a laser diode, and a circuit that generates a pulse. The light source 101 may also be a combination of a light emitting diode (LED) or various lamps and the circuit that generates a pulse.

Furthermore, there is no limitation on a frequency band of the pulsed light emitted by the light source 101. The pulsed light may be, for example, visible light, infrared light, near-infrared light, ultraviolet light, or a combination thereof. As an example, the pulsed light in the present embodiment is assumed to include a visible light component.

Furthermore, there is no limitation on a shape of the pulsed light emitted by the light source 101. It may be rectangular, triangular, a shape of a sinc function, or a shape of a Gaussian curve.

Examples of the command that the light source 101 receives from the control unit 111 include a pulse width (e.g., 10 ns) and a shape of the pulsed light to be emitted, and start time and a direction for emitting the pulsed light.

The pulsed light emitted by the light source 101 is reflected by the object 200, and is made incident on the light receiving unit 102 as reflected light. The reflected light may be either diffused reflected light or specular reflected light of the pulsed light on the object 200, or may be a combination thereof.

The light receiving unit 102 receives light, and outputs signals indicating the intensity of the received light. The signals are transmitted to the measurement unit 103, and are used to measure the ToF. Any type of device can be adopted as the light receiving unit 102 as long as it is capable of detecting light (including an electromagnetic wave). For example, it may be photodiodes, photomultiplier tubes, and the like. An avalanche photo diode (APD) having high detection sensitivity of light may be used as the photodiode. The APD may be used in the Geiger mode. A multi-pixel photon counter (MPPC) may be used as an array of the APD in the Geiger mode. Furthermore, a silicon photomultiplier (SiPM) may be used as the photomultiplier tube. In the present embodiment, it is assumed that the APD is used in the Geiger mode as an example. The APD outputs signals indicating the light intensity on the basis of the number of photons of the received light.

The light receiving unit 102 receives light and outputs signals indicating the intensity of the received light, and does not distinguish the light to be detected. That is, the light receiving unit 102 does not distinguish between the reflected light and the ambient light.

Note that the reflected light is the light obtained by the pulsed light reflected by the object 200, and the ambient light is the light in which a light source (e.g., the sun, light source of another device, etc.) that the light source 101 does not output is made incident on the light receiving unit.

The measurement unit 103 also measures the time (ToF) from the time at which the light source 101 emits the pulsed light to the time at which the light receiving unit 102 receives the reflected light. The measurement unit 103 receives, from the control unit 111, commands regarding a start of ToF measurement, a measurement range, intensity of signals to be determined as reflected light (light intensity), a transmission destination of the measured ToF, and the like. The measurement unit 103 measures ToF on the basis of the commands and the signals transmitted from the light receiving unit 102. The ToF is transmitted to the control unit 111, and is used to command the light source 101 and the measurement unit 103. In addition, the ToF is also transmitted from the control unit 111 to the calculation unit 112, and is used to calculate the distance between the electronic apparatus 100 and the object 200.

Note that the measurement unit 103 may measure a time required for transmission between components of the electronic apparatus 100 in advance, and may correct the measured ToF. The corrected ToF is also included in the time from the time at which the light source 101 emits the pulsed light to the time at which the light receiving unit 102 receives the reflected light.

Any type of devices can be used as the measurement unit 103 as long as a time can be measured on the basis of the command from the control unit 111 and the intensity of the signals transmitted from the light receiving unit 102. That is, for example, a time to digital converter (TDC), a clock circuit, or the like.

Furthermore, the measurement unit 103 includes an optional device that sets a measurement range and a start time of the ToF measurement commanded by the control unit 111. The measurement unit 103 can recognize the start time and the end time of time measurement using the device as a trigger. For example, the measurement unit 103 includes a digital to time converter (DTC).

The control unit 111 transmits commands to the light source 101 and the measurement unit 103. The command to the light source 101 is a pulse width (e.g., 10 ns) and a shape of the pulsed light to be emitted, time and a direction to start the emission of the pulsed light, and the like. The command to the measurement unit 103 is a measurement range (from time at which measurement starts to time at which measurement ends) until receiving reflected light from the object, a threshold value (light intensity) of signals to be determined as reflected light, and the like. In the command transmitted from the control unit 111 to the light source 101 and the measurement unit 103, the time at which the emission of the pulsed light starts coincides with the time at which the time measurement starts. Note that this coincidence includes a time lag that does not affect the calculation of ToF. In addition, this coincidence includes, in a case where there is a delay or the like in the route for transmitting each command, a time lag in consideration of the delay.

Furthermore, the control unit 111 transmits the ToF transmitted from the measurement unit 103 to the calculation unit 112. The ToF is used to calculate the distance d.

The control unit 111 may determine the content of the command directed to the light source 101 and the measurement unit 103 from the ToF transmitted from the measurement unit 103.

The calculation unit 112 calculates the distance d between the electronic apparatus 100 and the object 200 on the basis of the ToF transmitted from the control unit 111 and the formula (1) mentioned above. The distance d is transmitted to the output unit 104. The transmission of the distance d to the output unit 104 may be performed on the basis of the command from the control unit 111.

The output unit 104 outputs the distance d transmitted from the calculation unit 112. An output destination is not limited, and may be a device and a system that operate on the basis of the distance d, an electronic apparatus including a display, a storage device (none of which are illustrated) that retains the distance d, and the like.

The storage device is a memory or the like, which is, for example, a random access memory (RAM), a read-only memory (ROM), a programmable ROM (PROM), an erasable PROM (EPROM), an electrically EPROM (EEPROM), a flash memory, a register, or the like. In addition, the storage device may be a cloud server via the Internet.

Note that those devices and systems may be inside or outside the electronic apparatus 100. In addition, a format of information indicating the distance d is not limited, and may be a format that can be used as data, text, a two-dimensional drawing, a three-dimensional drawing, and the like. Moreover, an output format may be wired or wireless.

The processing unit 110 including the control unit 111 and the calculation unit 112 is electronic circuitry (processor) including an arithmetic device and a controller of hardware. Examples of the processor include a general-purpose processor, a central processing unit (CPU), a microprocessor, a digital signal processor (DSP), and a combination thereof. Further, the function of the measurement unit 103 may be implemented by the processing unit 110.

In more specifically, the measurement unit 103 measures a first duration from when first pulsed light is emitted until when first reflected light obtained by the first pulsed light being reflected by an object is received by the light receiving unit 102 within a first time range, on a basis of an electric signal obtained by photoelectric conversion of light received by the light receiving unit 102. The processing unit 110 determines, on a basis of the first duration, a second time range in which the light receiving unit receives second reflected light obtained by the second pulsed light being reflected by the object. The measurement unit 103 measures a second duration from when the second pulsed light is emitted until when the second reflected light is received by the light receiving unit 102, on a basis of the electric signal and the second time duration. The processing unit 110 determines the distance from the electronic apparatus to the object on a basis of the second duration.

The measurement unit 103 measures a time at which the first reflected light is received by the light receiving unit 102 within the first time range after the first pulsed light is emitted from the light source 101 and measures a time at which the second reflected light is received by the light receiving unit 102 within the second time range shorter than the first time range, after the second pulsed light is emitted from the light source 101.

The processing unit 110 lowers a second threshold value that is compared with the light reception intensity at the light receiving unit 102 in determination of whether or not the second reflected light has been received than a first threshold value that is compared with the light reception intensity at the light receiving unit 102 in determination of whether or not the first reflected light has been received. The processing unit 110 estimates first intensity that is average intensity of light received by the light receiving unit 102 after the first pulsed light is emitted on a basis of the electric signal, to determine, on a basis of the first intensity, the first threshold value for determining whether or not the received light includes the first reflected light. The measurement unit 103 determines the first reflected light on a basis of the first threshold value to measure the first duration.

The processing unit 110 estimates second intensity that is average intensity of light received the light receiving unit 102 after the second puled light is emitted based on the electric signal, to determine, on a basis of the second intensity, the second threshold value for determining whether or not the received light includes the second reflected light. The measurement unit 103 determines the second reflected light on a basis of the second threshold value to measure the second duration. The processing unit 110 may determine at least one of the first and second threshold values further on a basis of object's light reflectivity. The second intensity is estimated on a basis of an electric signal obtained by photoelectric conversion of light received by the light receiving unit 102 before the second time range, within the above-described electric signal. The second threshold value is set to a value smaller than the first threshold value.

The electronic apparatus 100 according to the present embodiment determines a distance to an object based on at least first reflected light provided by a reflection of first pulsed light on the object and second reflected light provided by a reflection of a second pulsed light on the object. The electronic apparatus 100 may have input terminal configured to receive an electrical signal of intensity of reception light, and the processing unit 110. The processing unit 110 may specify, based on the electrical signal, a first duration from when the first pulsed light is emitted until when the first reflected light is received within a first measurement range, and determine, based on the first duration, a second measurement range of the second reflected light, specify, based on the electrical signal, a second duration from when the second pulsed light is emitted until when the second reflected light is received within the second measurement range, and determine the distance from the electronic apparatus to the object according to the second duration.

The components of the electronic apparatus 100 have been described above. The connection between the components may be wired or wireless. Furthermore, the electronic apparatus 100 is mounted as integrated circuitry, such as an integrated circuit (IC) and large scale integration (LSI). It may be collectively mounted on one chip, or a part of the components may be mounted on another chip.

The electronic apparatus 100 is a device that measures ToF, which is a time from the time at which the light source 101 emits the pulsed light to the time at which the light receiving unit 102 receives the reflected light, twice in calculating the distance d. The second measurement of the ToF is performed with accuracy higher than that of the first measurement. The operation of calculating the distance d performed by the electronic apparatus 100 according to the present embodiment will be described with reference to FIGS. 2 and 3.

Figure 2:
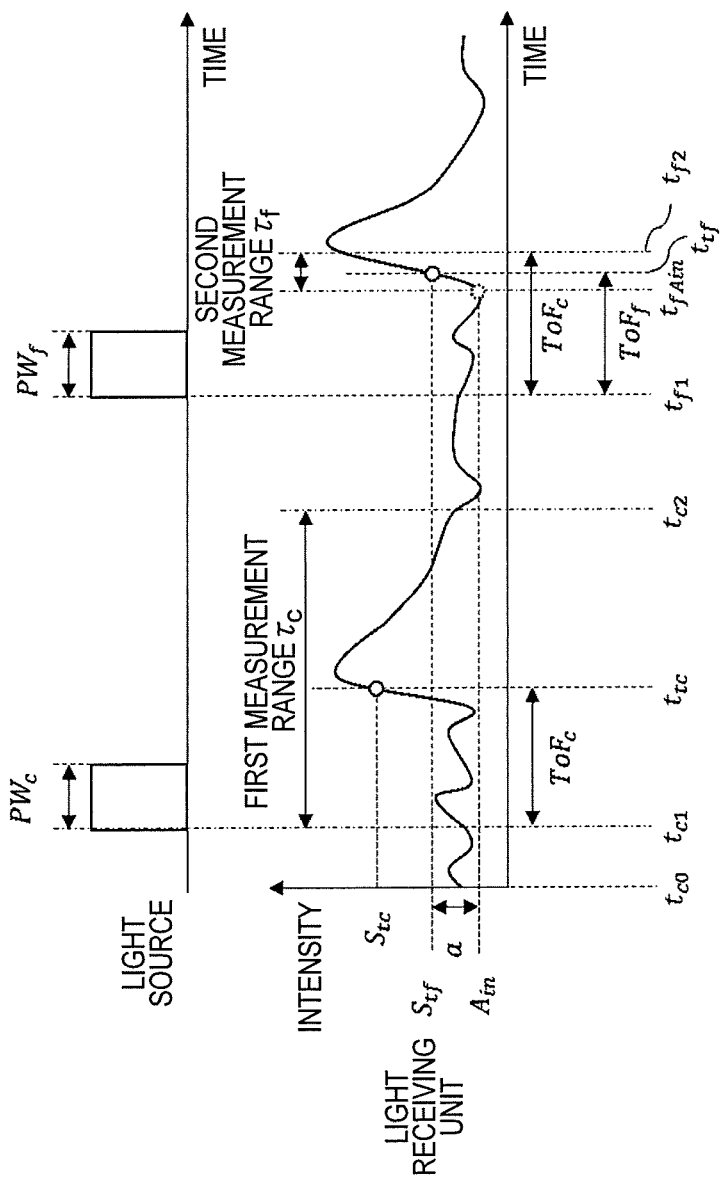
FIG. 2 is a diagram for illustrating an operation condition of a light source and intensity of signals output from a light receiving unit.
Figure 3:
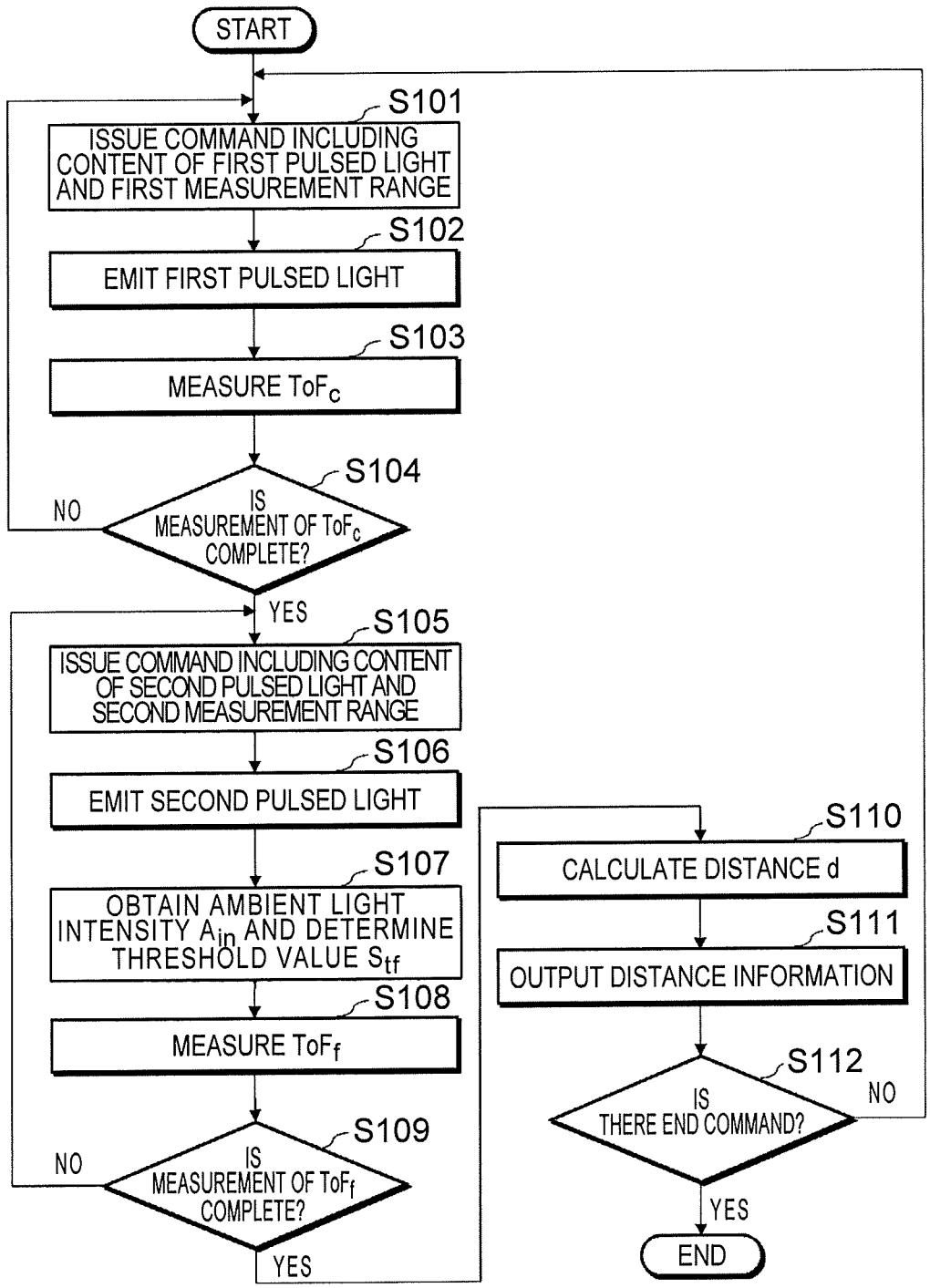
FIG. 3 is a flowchart of operation of the electronic apparatus according to the first embodiment.

FIG. 2 illustrates an operation condition of the light source 101 and the intensity of signals output from the light receiving unit 102 at each time. The intensity of signals output from the light receiving unit 102 indicates the intensity of light received by the light receiving unit 102. FIG. 3 is a flowchart of the operation of the electronic apparatus 100 in calculating the distance d. Hereinafter, the operation of the electronic apparatus 100 will be described with reference to FIG. 2 and the flowchart of the operation.

Note that the ToF in the first measurement is also referred to as $ToF_c$, and the ToF in the second measurement is also referred to as $ToF_f$. In addition, in the present embodiment, the light receiving unit 102 receives light regardless of the flowchart of the operation to be described below. The light receiving unit 102 transmits signals to the measurement unit 103 at intensity corresponding to the intensity of the received light. It is assumed that the measurement unit 103 uses a TDC to measure time.

First, the operation of the electronic apparatus 100 in measuring $ToF_c$, which is the ToF in the first measurement, will be described using steps S101 to S104. The electronic apparatus 100 measures the $ToF_c$ using predetermined pulsed light, intensity (threshold value) of signals to be determined as reflected light, and a measurement range of time.

Hereinafter, the pulsed light in the measurement of the $ToF_c$ is also referred to as first pulsed light, and the measurement range of time in the measurement of the $ToF_c$ is also referred to as a first measurement range. In addition, the reflected light in the first pulsed light is also referred to as first reflected light.

The control unit 111 determines a command regarding the measurement of the $ToF_c$, and transmits it to the light source 101 and the measurement unit 103 (step S101). The command includes the content of the first pulsed light, the first measurement range, and the like.

Specifically, the control unit 111 issues commands regarding the pulse width and the shape of the pulsed light to be emitted by the light source 101, and the start time and the direction of the emission of the pulsed light. In the present embodiment, as an example, the control unit 111 commands the light source 101 to emit rectangular first pulsed light with a pulse width $PW_c$ at start time $t_{c1}$ toward the direction in which the object 200 exists.

The control unit 111 issues a command regarding time at which the measurement unit 103 starts the time measurement. The time is the time $t_{c1}$ at which the light source 101 emits light.

Further, the control unit 111 issues, to the measurement unit 103, a command regarding a threshold value $S_{tc}$ of the intensity of the signals transmitted from the light receiving unit 102. The threshold value $S_{tc}$ is set to a value that is likely to be higher than the ambient light received by the light receiving unit 102, and is likely to be lower than the reflected light received by the light receiving unit 102. The measurement unit 103 can estimate the ambient light and the reflected light while distinguishing them on the basis of the threshold value $S_{tc}$. In the present embodiment, as an example, the control unit 111 sets a predetermined value as the threshold value $S_{tc}$.

Furthermore, the control unit 111 transmits the first measurement range to the measurement unit 103. In FIG. 2, the time length of the first measurement range is represented as $T_c$ from the time $t_{c1}$ to time $t_{c2}$. In the present embodiment, as an example, the time length $T_c$ of the first measurement range is set to a predetermined value by the control unit 111. The first measurement range including the time $t_{c1}$ and the time $t_{c2}$ is set in the DTC included in the measurement unit 103.

Next, the light source 101 emits first pulsed light (step S102). FIG. 2 illustrates that the light source 101 emits the first pulsed light with the pulse width $PW_c$ at the time $t_{c1}$. At the time same as the emission of the light source 101, the measurement unit 103 recognizes that, using the DTC, it is the time to start time measurement, and starts the time measurement.

The first pulsed light emitted from the light source 101 is at least partially reflected by the object 200 that is a distance measurement target, and is received by the light receiving unit 102 as first reflected light.

Next, the measurement unit 103 measures $ToF_c$ (step S103). As described above, the measurement unit 103 starts the time measurement at the time $t_{c1}$. The measurement unit 103 performs measurement from the time $t_{c1}$ to the time at which the intensity of the signals transmitted from the light receiving unit 102 first reaches or exceeds the threshold value $S_{tc}$ within the first measurement range, which is defined as $ToF_c$. In FIG. 2, the time at which the intensity of the signals transmitted from the light receiving unit 102 first reaches or exceeds the threshold value $S_{tc}$ within the first measurement range is represented as $t_{tc}$.

That is, the $ToF_c$ in the present embodiment is a time from the start time $t_{c1}$ to the end time $t_{tc}$ (time at which the reflected light is received). The measurement unit 103 transmits the measured $ToF_c$ to the control unit 111. On the other hand, in the case where the measurement unit 103 does not receive a signal equal to or higher than the threshold value within the first measurement range, even if there is a signal equal to or higher than the threshold value outside the first measurement range, it is not measured as $ToF_c$.

At the time $t_{c2}$, the measurement unit 103 recognizes that, using the DTC, it is the time to terminate the time measurement, and terminates the time measurement. The control unit 111 checks whether the $ToF_c$ has been transmitted from the measurement unit 103, and checks whether or not the measurement of the $ToF_c$ has been complete (step S104). In the case where the control unit 111 fails to confirm the $ToF_c$ from the measurement unit 103 (No in step S104), the process returns to step S101, and the measurement of the $ToF_c$ starts again.

On the other hand, in the case where the control unit 111 succeeds in confirming the $ToF_c$ (Yes in step S104), the measurement of the $ToF_c$ is terminated.

Next, the operation of the electronic apparatus 100 in the second measurement of $ToF_f$ will be described using steps S105 to S109. The electronic apparatus 100 determines at least a part of the pulsed light, the intensity (threshold value) of the signals to be determined as reflected light, and the measurement range of time on the basis of the measured $ToF_c$. The electronic apparatus 100 uses those to measure the $ToF_f$.

Hereinafter, the pulsed light in the measurement of the $ToF_f$ is also referred to as second pulsed light, and the measurement range of time in the measurement of the $ToF_f$ is also referred to as a second measurement range. In addition, the reflected light in the second pulsed light is also referred to as second reflected light.

The control unit 111 determines a command in the measurement (second measurement) of the ToF$_f$ (step S105), and transmits each command to the light source 101 and the measurement unit 103 (step S106). The command includes the content of the pulsed light, such as the emission time, the pulse width, the shape, and the like of the second pulsed light emitted by the light source 101. In addition, the command includes a measurement range (hereinafter also referred to as a second measurement range) in the measurement of the ToF$_f$, and a threshold value in the determination of the second reflected light.

Specifically, the control unit 111 commands the light source 101 to emit rectangular second pulsed light with a pulse width PW$_f$ at time t$_{f1}$ toward the direction of the object 200 in the manner same as the measurement of ToF$_c$. Although the pulse width PW$_c$ and the pulse width PW$_f$ are illustrated to have the same width in FIG. 2, they may be different widths. In a case where the electronic apparatus 100 is moving with respect to the direction in which the second pulsed light is emitted, the control unit 111 may calculate the distance of movement between the time t$_{c1}$ and the time t$_{f1}$ and correct the direction.

The control unit 111 issues a command regarding time at which the measurement unit 103 starts the time measurement. This time is the time t$_{f1}$ at which the light source 101 emits the second pulsed light. The time t$_{f1}$ is set in the DTC included in the measurement unit 103.

Further, the control unit 111 transmits a command regarding the second measurement range to the measurement unit 103. In the case where a signal equal to or higher than the threshold value within the second measurement range is received, the measurement unit 103 define, as ToF$_f$, the time from the start time of the measurement to the time at which the signal is received. The threshold value in the measurement of the ToF$_f$ will be described later. On the other hand, in the case where the measurement unit 103 does not receive a signal equal to or higher than the threshold value within the second measurement range, even if there is a signal equal to or higher than the threshold value outside the second measurement range, it is not measured as ToF$_f$. The second measurement range including time t$_{fAin}$ and time t$_{f2}$ is set in the DTC included in the measurement unit 103.

The determination of the second measurement range is different from the case of the measurement of ToF$_c$. First, the control unit 111 sets a time length T$_f$ of the second measurement range. As an example, the T$_f$ is assumed to be a specific value determined in advance.

Next, the control unit 111 sets the time t$_{f2}$, which is the time after the ToF$_c$ has elapsed from the time t$_{f1}$ at which the measurement unit 103 starts the time measurement, as the end time of the second measurement range. The control unit 111 sets the time t$_{fAin}$, which is the time T$_f$ earlier than the time t$_{f2}$, as the start time of the second measurement range. That is, the control unit 111 transmits a command to the measurement unit 103 with the time length T$_f$ from the time t$_{fAin}$ to the time t$_{f2}$ serving as the second measurement range.

Here, the time length T$_f$ is set to be shorter than the ToF$_c$. The reason therefor will be described below. Since the control unit 111 is capable of estimating an approximate value of the ToF$_f$ from the ToF$_c$, it sets the second measurement range to be narrower than the ToF$_c$. With the second measurement range being set to be narrower by the control unit 111, the probability that the light receiving unit 102 receives ambient light with high intensity is reduced. The reduction in the probability of receiving the ambient light with high intensity leads to improvement in the accuracy of ToF$_f$. The second measurement range may be shorter than the first measurement range as well as ToF$_c$.

Unlike the measurement of ToF$_c$, the control unit 111 does not determine the threshold value (hereinafter referred to as a threshold value S$_{tf}$) of the intensity of the signals transmitted from the light receiving unit 102 in the measurement of ToF$_f$ at this time point. The determination of the threshold value S$_{tf}$ will be described later. In step S108, the threshold value S$_{tf}$ is determined on the basis of the intensity of the ambient light in the second measurement range.

Next, the light source 101 emits second pulsed light (step S106). FIG. 2 illustrates that the light source 101 emits the second pulsed light with the pulse width PW$_f$ at the time t$_{f1}$. At the time same as the emission of the light source 101, the measurement unit 103 recognizes that, using the DTC, it is the time to start time measurement, and starts the time measurement.

In a similar manner to the case of the measurement of ToF$_c$, the second pulsed light emitted from the light source 101 is at least partially reflected by the object 200 that is a distance measurement target, and is received by the light receiving unit 102 as second reflected light.

Next, the measurement unit 103 obtains the intensity of the ambient light in the second measurement range, and the control unit 111 determines the threshold value S$_{tf}$ (step S108). For example, the measurement unit 103 recognizes that, using the DTC, it is the time of the starting end of the second measurement range, and measures intensity A$_{in}$ representing the light intensity at t$_{fAin}$, which is the start time of the second measurement range. The control unit 111 estimates that the intensity A$_{in}$ is the intensity of the ambient light, and further adds "a" to determine the threshold value S$_{tf}$. The control unit 111 transmits the determined threshold value S$_{tf}$ to the measurement unit 103.

The "a" is a value for determining the threshold value S$_{tf}$ to be higher than the estimated ambient light intensity A$_{in}$. In the present embodiment, as an example, it is assumed to be a specific value determined in advance.

Next, the measurement unit 103 measures ToF$_f$ (step S108). In a similar manner to the description of the measurement of ToF$_c$, the measurement unit 103 performs measurement from the time t$_{f1}$ to the time at which the intensity of the signals transmitted from the light receiving unit 102 first reaches or exceeds the threshold value S$_{tf}$ within the second measurement range, which is defined as ToF$_f$. In FIG. 2, the time at which the intensity of the signals transmitted from the light receiving unit 102 first reaches or exceeds the threshold value S$_{tf}$ within the first measurement range is represented as t$_{tf}$. That is, the ToF$_f$ in the present embodiment is a time from the time t$_{f1}$ to the time t$_{tf}$. The measurement unit 103 transmits the measured ToF$_f$ to the control unit 111.

At the time t$_{f2}$, the measurement unit 103 recognizes that, using the DTC, it is the time to terminate the time measurement, and terminates the time measurement. The control unit 111 checks whether the ToF$_f$ has been transmitted from the measurement unit 103, and checks whether or not the measurement of the ToF$_f$ has been complete (step S109). In the case where the control unit 111 fails to confirm the ToF$_f$ from the measurement unit 103 (No in step S109), the process returns to step S105, and the measurement of the ToF$_f$ starts again. In the case where the control unit 111 succeeds in confirming the ToF$_f$ (Yes in step S109), the ToF$_f$ is transmitted to the calculation unit 112, and the measurement of the ToF$_f$ is terminated.

Next, operation of the electronic apparatus 100 for calculating the distance d between the electronic apparatus 100 and the object 200 will be described using steps S110 to S111. The electronic apparatus 100 calculates the distance d on the basis of the measured $ToF_f$. The electronic apparatus 100 outputs information including the calculated distance d.

The calculation unit 112 calculates the distance d on the basis of the $ToF_f$ transmitted from the control unit 111 and the formula (1) (step S110). The calculated distance d is transmitted to the output unit 104 as information including the distance d.

Next, the output unit 104 outputs the information including the distance d transmitted from the calculation unit 112 (step S111). The output destination and the output format are not limited as described above.

Next, the control unit 111 checks whether or not an end command for terminating the operation of the electronic apparatus 100 has arrived (step S112). The end command is a command for terminating the operation of the electronic apparatus 100 in the present flow. The end command is transmitted to the control unit 111 by a user making input to the electronic apparatus 100, the electronic apparatus 100 obtaining signals including the end command, or the like. The end command may be a command for immediately terminating the operation of the electronic apparatus 100.

In the case where the end command has not arrived at the control unit 111 (No in step S112), the process returns to step S101. On the other hand, in the case where the end command has arrived at the control unit 111 (Yes in step S112), the flow is terminated, and the electronic apparatus 100 terminates the operation.

The foregoing has described the operation of the electronic apparatus 100 according to the present embodiment. Hereinafter, the threshold values $S_{tc}$ and $S_{tf}$ will be described with reference to FIGS. 4 and 5.

Figure 4:
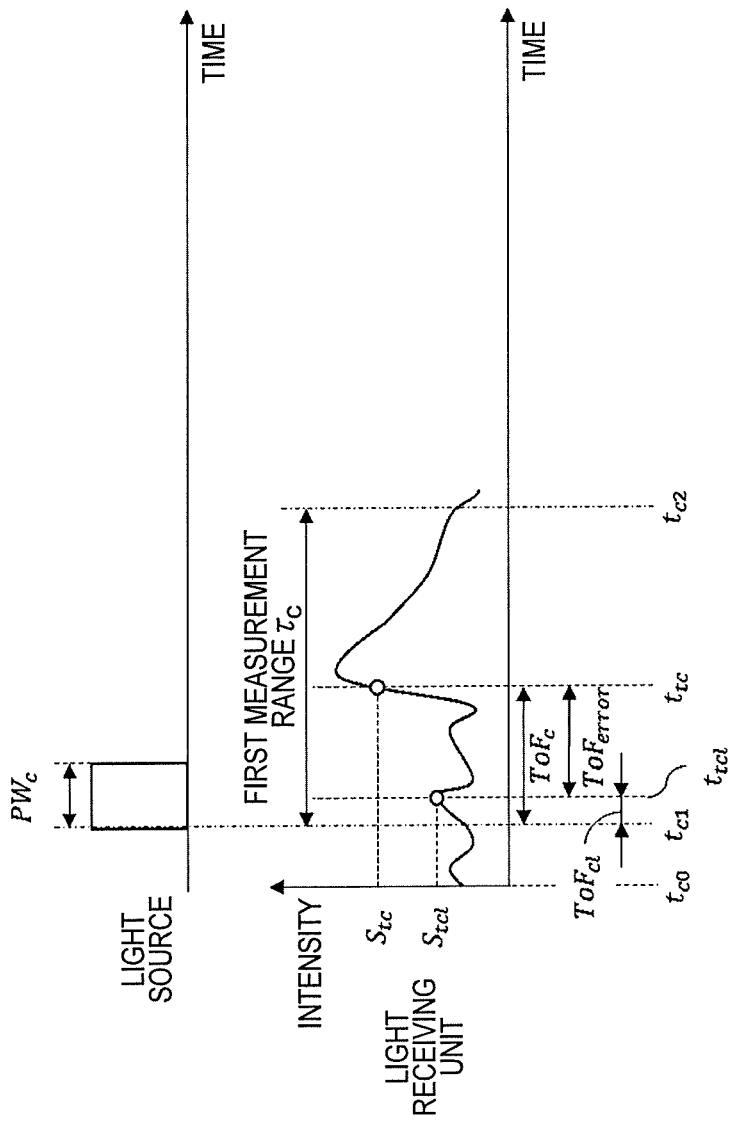
FIG. 4 is a diagram for illustrating a threshold value for determining as reflected light.

First, the threshold value $S_{tc}$ will be described with reference to FIG. 4. In FIG. 4, $ToF_c$ and $ToF_{cl}$ are illustrated as the ToF in the case where $S_{tc}$ is set as a threshold value and the case where $S_{tcl}$ is set as a threshold value. The threshold value $S_{tcl}$ is lower than the threshold value $S_{tc}$. When the threshold value is lowered, the possibility that the intensity of the ambient light, not the reflected light, reaches or exceeds the threshold value increases.

In FIG. 4, it is equal to or higher than the threshold value $S_{tcl}$ at time $t_{tcl}$. At the time $t_{tcl}$, the light source 101 is in the period of emitting the first pulsed light, whereby the possibility of being the first reflected light is low. That is, the measurement unit 103 detects the ambient light as the first reflected light, and measures the $ToF_{cl}$, which is incorrect ToF. An error $ToF_{error}$ of the ToF is large as compared with the $ToF_c$ that is ToF at the threshold value $S_{tc}$.

As described above, the ambient light is erroneously detected as the first reflected light, thereby decreasing the accuracy of ToF. Therefore, the threshold value is set to a value that is likely to be higher than the ambient light intensity, and is likely to be lower than the reflected light intensity.

Note that, in setting the threshold value $S_{tc}$, the control unit 111 may set the threshold value on the basis of estimated intensity of ambient light in addition to the predetermined value.

Next, the reason that the determination of the threshold value $S_{tf}$ is based on the ambient light intensity will be described with reference to FIG. 5. In general, in the measurement of ToF, the intensity of signals output from the light receiving unit 102 is dependent on the intensity of the received light, whereby, even for the same pulsed light, the output changes depending on the ambient light intensity and the light reflectivity of the object 200.

Figure 5:
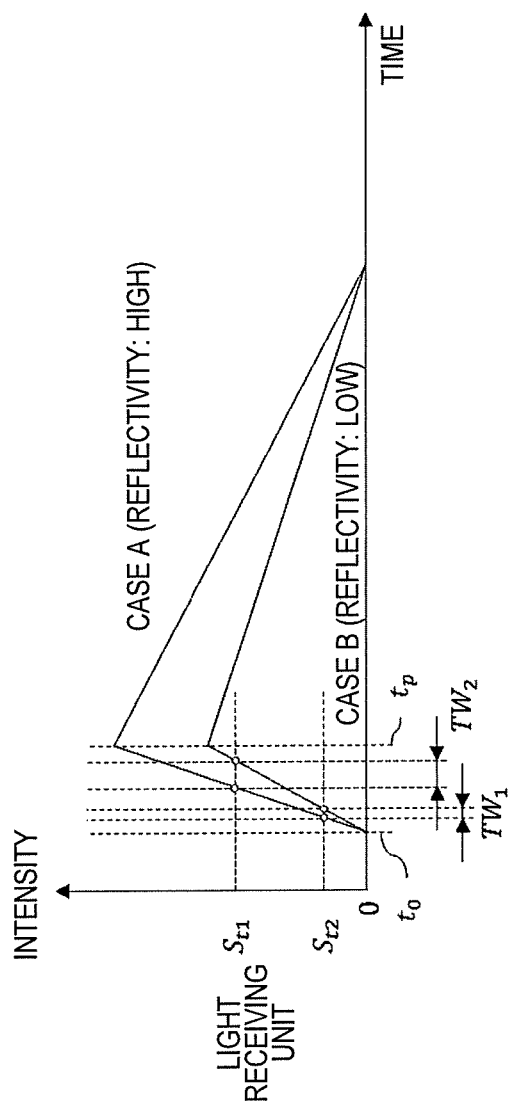
FIG. 5 is a diagram for illustrating a relationship between the threshold value for determining as the reflected light and accuracy of time of flight (ToF)

For the sake of explanation, FIG. 5 illustrates the intensity of reflected light in an environment in which ambient light is not considered. A case where the reflectivity of the object by which the pulsed light is reflected is high is represented as a case A, and a case where the reflectivity of the object is low is represented as a case B. The time at which the pulsed light is emitted is set to 0, and time $t_0$ is set as a true value of the arrival time of the reflected light. The true value is a value with which the distance between the electronic apparatus 100 and the object can be accurately calculated when calculation is carried out using the formula (1) with the time $t_0$ as the ToF. Time $t_p$ is the time at which the intensity of the reflected light in the two cases reaches the peak. Note that the emitted pulsed light is assumed to be similar in both two cases.

In this example, the threshold value $S_{t1}$ and the threshold value $S_{t2}$ lower than $S_{t1}$ are set to consider ToF in the two cases. The ToF in the two cases with the threshold value $S_{t2}$ is closer to the time $t_0$, which is the true value, than the ToF in the two cases with the threshold value $S_{t1}$. Furthermore, the difference (TW1) in the ToF in the two cases with the threshold value $S_{t2}$ is smaller than the difference (TW2) in the ToF in the two cases with the threshold value $S_{t1}$. The ToF closer to the true value can be measured as the threshold value is lower, and the influence of the reflectivity of the object to be measured is small. Therefore, the accuracy of ToF can be improved.

Meanwhile, the light receiving unit 102 also receives ambient light. In the case where the threshold value is equal to or lower than the ambient light intensity, reflected light cannot be detected. The threshold value needs to be set to a value that is likely to exceed the ambient light intensity.

Therefore, estimating the ambient light intensity and determining the threshold value $S_{tf}$ on the basis of the intensity leads to improvement in the accuracy of ToF.

Note that the electronic apparatus 100 can operate if the control unit 111 sets a predetermined value set in advance as the threshold value $S_{tc}$.

While the present embodiment has been described as above, various modifications can be implemented and executed. For example, in the present embodiment, the light receiving unit 102 expresses the intensity of the received light by the intensity of signals. The light receiving unit 102 may not necessarily express the intensity of the received light by the intensity of signals. The light receiving unit 102 can output optional signals representing the intensity of the received light.

Although the control unit 111 issues commands to the light source 101 and the measurement unit 103 in the same step (S101 and S105) in the present embodiment, it may be partially different. For example, the control unit 111 issues, to the light source 101, a command regarding information related to pulsed light to be emitted by the light source 101. Although the control unit 111 issues a command regarding the start time of the time measurement to the measurement unit 103 in the same step, as a variation, the threshold value, the first measurement range, and the like may be after the emission of the first pulsed light performed by the light source 101. The control unit 111 may issue a command regarding the second measurement range to the measurement unit 103 after the emission of the second pulsed light performed by the light source 101.

In the present embodiment, the control unit 111 issues commands to the light source 101 and the measurement unit 103 in steps S101 and S105. As a variation, a command and notification to another component of the electronic apparatus 100 may be further added, a command may be issued with content different from that of the command described, or at least a part of the commands described may not be issued.

Hereinafter, an exemplary command and notification added by the control unit 111 will be described. The control unit 111 may notify the light receiving unit 102 of information regarding pulsed light to be emitted by the light source 101. The information regarding the pulsed light is, for example, a pulse width, emission time, a shape, an emission direction, and the like of the pulsed light. This is applicable to both the first pulsed light and the second pulsed light.

The control unit 111 may not issue a command regarding the first measurement range and the second measurement range to the measurement unit 103. In that case, the measurement unit 103 measures $ToF_c$ and $ToF_f$, and transmits them to the control unit 111. The control unit 111 may check whether the transmitted $ToF_c$ is within the first measurement range and $ToF_f$ is within the second measurement range.

Furthermore, as a variation, the light source 101 and the measurement unit 103 may set in advance the content of the commands described above in the measurement of $ToF_c$. Along with this, the commands from the control unit 111 may not be issued partially. That is, the light source 101 may be set to emit the rectangular first pulsed light with the pulse width $PW_c$ at the time $t_{c1}$. The time length of the first measurement range and the threshold value $S_{tc}$ may be set in the measurement unit 103 in advance, and the first measurement range may be set upon reception of the time $t_{c1}$ for starting measurement from the control unit 111.

Although the starting end of the first measurement range commanded in step S101 is illustrated to be the time at which the first pulsed light is emitted in FIG. 2 in the present embodiment, it is not limited thereto. As a variation, the starting end of the first measurement range may be before or after the time at which the first pulsed light is emitted.

The same applies to the starting end and the end of the second measurement range. In the present embodiment, the starting end of the second measurement range commanded in step S105 is later than the time at which the first pulsed light is emitted. As a variation, the starting end of the second measurement range may be the time at which the first pulsed light is emitted or the time earlier than this time.

Furthermore, in the present embodiment, the end of the second measurement range commanded in step S101 is the time $t_{f2}$, which is the time after the $ToF_c$ has elapsed from the time at which the first pulsed light is emitted. As a variation, the end of the second measurement range may be before or after the time $t_{f2}$.

Note that the time length $T_f$ of the second measurement range is set to be shorter than the $ToF_c$ or the time length $T_c$ of the first measurement range.

In the present embodiment, the threshold value $S_{tc}$ commanded in step S101 has been described to be a specific value. As a variation, the control unit 111 may determine the threshold value $S_{tc}$ on the basis of the ambient light intensity. An example of determining the threshold value $S_{tc}$ on the basis of the ambient light intensity will be described with reference to FIG. 6.

Figure 6:
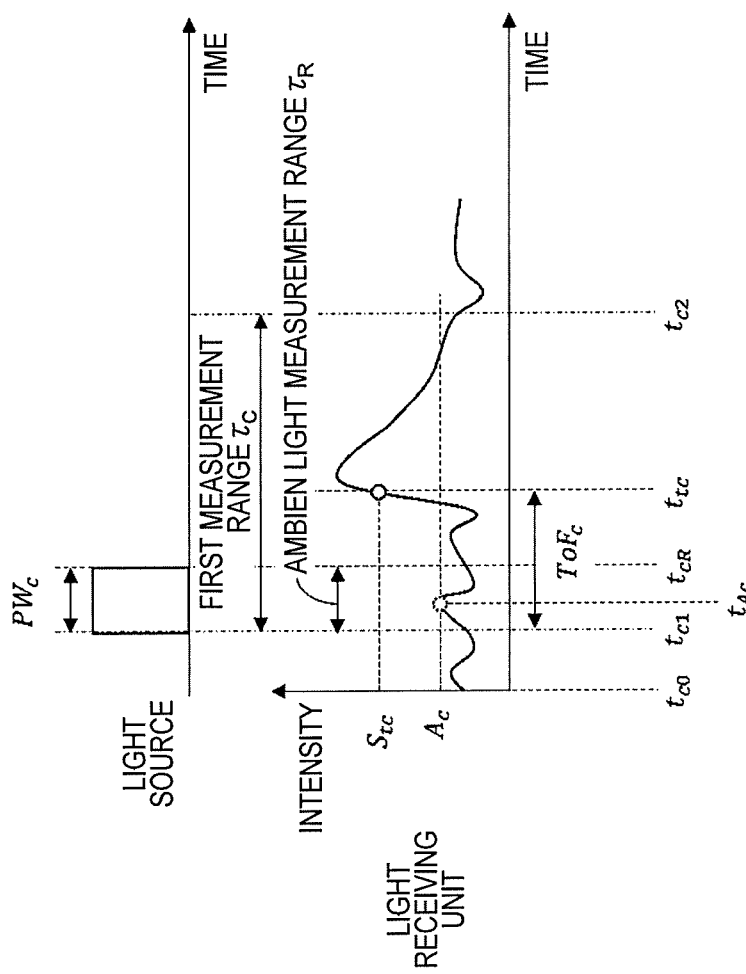
FIG. 6 is a diagram for illustrating determination of a threshold value based on intensity of ambient light.

In the variation, the control unit 111 does not issue a command regarding the threshold value to the measurement unit 103 in step S101. The control unit 111 issues a command regarding an ambient light measurement range to the measurement unit 103 before step S101. In FIG. 6, the ambient light measurement range is illustrated as a time length $T_R$ from the time $t_{c1}$ to time $t_{cR}$. The setting of the ambient light measurement range is not limited to the case illustrated in FIG. 6. The start time of the measurement range and the width of the measurement range are not limited to the present embodiment. For example, an optional ambient light measurement range may be set before the time $t_{c1}$ at which the pulsed light is emitted.

Further, the control unit 111 commands the measurement unit 103 to transmit, to the control unit 111, the maximum intensity within the ambient light measurement range among the signals output from the light receiving unit 102. The intensity of the signals transmitted by the measurement unit 103 to the control unit 111 is not limited to the maximum intensity within the ambient light measurement range. For example, the measurement unit 103 may transmit the intensity of the signals within the ambient light measurement range to the control unit 111. Further, the measurement unit 103 may transmit, to the control unit 111, a value based on the average value, the median value, or the maximum value of the intensity of the signals within the ambient light measurement range.

Returning to the description of FIG. 6, the measurement unit 103 estimates that maximum intensity $A_c$ of the signals within the ambient light measurement range is the ambient light intensity, and transmits it to the control unit 111. The control unit 111 determines the threshold value $S_{tc}$ on the basis of the intensity $A_c$. For example, the control unit 111 determines the threshold value $S_{tc}$ using a formula (2).

[Formula 2]

$$S_{tc} = A_c \times \alpha \quad (2)$$

In the formula (2), $\alpha$ represents an optional coefficient. Note that the formula (2) is applicable to, in addition to the intensity $A_c$ that is the maximum value, a value based on the average value, the median value, or the maximum value of the intensity of the signals within the ambient light measurement range, or may be based on the value having been subject to statistical processing.

In the case where the measurement unit 103 transmits the intensity of the signals within the ambient light measurement range to the control unit 111, the control unit 111 may determine the threshold value $S_{tc}$ using, for example, a formula (3).

[Formula 3]

$$S_{tc} = A_{ave} + V_A \times \beta \quad (3)$$

In the formula (3), $A_{ave}$ represents the average value of the signals within the ambient light measurement range, $\beta$ represents an optional coefficient, and $V_A$ is a value representing a change in the intensity of the signals within the ambient light measurement range, examples of which include a variance value, and a value obtained by the absolute value of the difference between $A_{ave}$ and the intensity of the signals within the ambient light measurement range being averaged. Note that the formula (3) is applicable to, in addition to the intensity $A_{ave}$ that is the average value, a value based on the average value, the median value, or the maximum value of the intensity of the signals within the ambient light measurement range, or may be based on the value having been subject to statistical processing.

The control unit 111 transmits the determined threshold value $S_{tc}$ to the measurement unit 103. Thereafter, measurement of $ToF_c$ is performed as described in the present embodiment.

Note that the method of determining the threshold value is also applicable to the determination of the threshold value $S_{tf}$ in the measurement of $ToF_f$.

In the present embodiment, in step S103, the measurement unit 103 measures, as ToF, a time from the time at which a command is received from the control unit 111 to the time at which the intensity of signals first reaches or exceeds the threshold value within the measurement range.

As a variation, the measurement unit 103 may only obtain the time at which the intensity of signals first reaches or exceeds the threshold value within the measurement range as the time at which the reflected light is received. The measurement unit 103 may transmit the time to the control unit 111, and the control unit 111 may take, as ToF, the difference between the time and the time at which the time measurement is started. Even in that case, it is included in the measurement of ToF performed by the measurement unit 103.

Although the time length $T_f$ of the second measurement range commanded in step S105 is set to a specific value determined in advance in the present embodiment as an example, the method of determining the time length $T_f$ can be variously considered.

As a variation, the control unit 111 may calculate the time length $T_f$ on the basis of $ToF_c$. The calculation of $T_f$ by the control unit 111 may be carried out by a formula or by referring to a look-up table defined for each value of $ToF_c$. Furthermore, in the light receiving unit 102, there is an upper limit in the inclination (hereinafter also referred to as reactivity) of the intensity of the signals to be output. The reactivity may be measured in advance, and $T_f$ may be set in the control unit 111. The measurement of the reactivity may be experiment or simulation.

In the present embodiment, the intensity $A_{in}$ of the ambient light at the starting end of the second measurement range is used for determining the threshold value $S_{tf}$ commanded in step S107. The method of obtaining the ambient light intensity is not limited to the ambient light intensity at the starting end of the second measurement range, and any method can be adopted. As a variation, for example, it may be the maximum value of the ambient light intensity in a predetermined time zone before the time $t_{fAin}$. Furthermore, the average value of the ambient light intensity in the time zone between the time of the maximum value and the time $t_{fAin}$ may be used.

In the present embodiment, "a" used to determine the threshold value $S_{tf}$ commanded in step S107 is a specific value. There are various ways to determine this "a". As a variation, the intensity of signals output from the light receiving unit 102 may be measured in advance with respect to the intensity of specific light, and "a" may be determined on the basis of the measured value. Alternatively, an increase in the intensity of signals output from the light receiving unit 102 may be measured in advance with respect to a specific increase in the light intensity, and "a" may be determined on the basis of the measured value. Any index such as an amount of photons, illuminance, and luminance may be used as the light intensity.

In the present embodiment, the measurement of $ToF_f$ is performed again in the case where the control unit 111 fails to confirm $ToF_f$ in step S109. As a variation, in the case where the control unit 111 fails to confirm $ToF_f$, $ToF_c$ may be transmitted to the calculation unit 112. The calculation unit 112 may calculate the distance d on the basis of the $ToF_c$.

In the present embodiment, the calculation unit 112 calculates the distance d on the basis of $ToF_f$ in step S110. As a variation, the calculation unit 112 may calculate the distance d also on the basis of $ToF_c$. For example, the distance d may be calculated on the basis of the average value of $ToF_c$ and $ToF_f$.

In the present embodiment, the output unit 104 outputs information including the distance d in step S111. As a variation, the output unit 104 may output time information of at least one of $ToF_c$ and $ToF_f$. The output unit 104 may receive the time information from the measurement unit 103 and the control unit 111 in addition to the calculation unit 112. The output unit 104 may combine and output information including the distance d and the time information.

As a variation of a part of components, the electronic apparatus 100 may include a storage. The storage may retain information for performing the operation described in the present embodiment, and the components of the electronic apparatus 100 may obtain necessary information from the storage.

Note that the storage is a memory or the like, which is, for example, a random access memory (RAM), a read-only memory (ROM), a programmable ROM (PROM), an erasable PROM (EPROM), an electrically EPROM (EEPROM), a flash memory, a register, or the like.

Further, the storage may be provided inside the electronic apparatus 100, or may be provided outside. In the case where it is externally provided, the storage may be a cloud that retains information via the Internet.

Furthermore, the operation performed by the processing unit 110 in the present embodiment may be implemented by a program being processed. For example, a general-purpose computer incorporating the program may be caused to perform the operation in the processing unit 110.

The program may be stored and provided in a computer readable storage medium, such as a compact disc read-only memory (CD-ROM), a memory card, a CD recordable (CD-R), and a digital versatile disk (DVD), as a file in an installable or executable format. Furthermore, the program may be stored in a computer connected to a network, such as the Internet, to be provided via the network, or may be incorporated and provided in a storage medium, such as a ROM, a hard disk drive (HDD), and a solid state drive (SSD).

The foregoing has described the variations in a part of the components and steps. Hereinafter, variations to be described with reference to the drawings will be described.

In the present embodiment, as illustrated in FIG. 2, the control unit 111 issues a command regarding the measurement of $ToF_f$ after the first measurement range commanded to the measurement unit 103 ends. As a variation, in the case where the measurement of $ToF_c$ performed by the measurement unit 103 has been complete, the control unit 111 may issue a command to measure $ToF_f$ even within the first measurement range.

Figure 7:
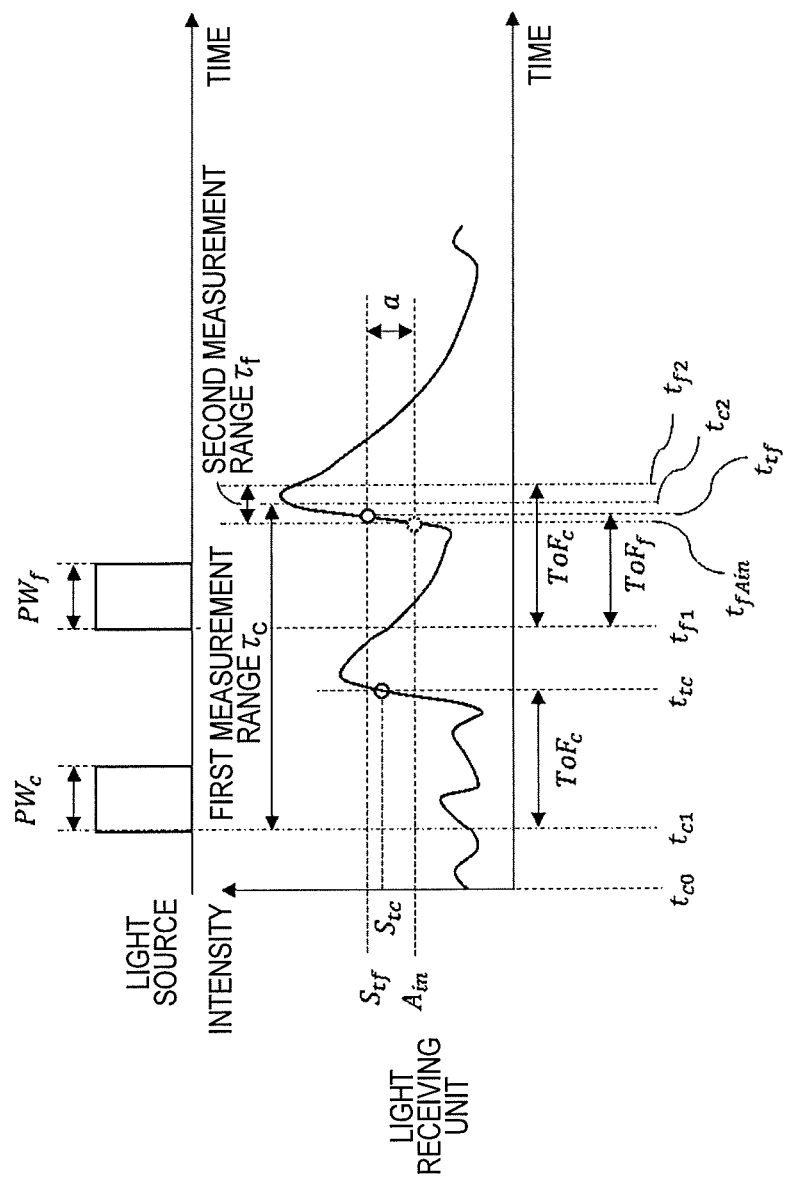
FIG. 7 is a diagram for illustrating measurement of $ToF_f$ performed in a first measurement range.

The case where the control unit 111 issues a command to measure $ToF_f$ even within the first measurement range will be described with reference to FIG. 7. Note that the measurement of $ToF_c$ and the preceding steps are similar to those described in the present embodiment (steps S101 to S104), and thus descriptions thereof will be omitted.

In this case, the operation of the electronic apparatus 100 is not changed. The control unit 111 determines a command for the measurement of $ToF_f$ from the $ToF_c$ transmitted from the measurement unit 103, and transmits it to the light source 101 and the measurement unit 103. The command includes the content of the second pulsed light and the second measurement range (step S105).

According to the command, the light source 101 can emit the second pulsed light even within the first measurement range, and the measurement unit 103 can start time measurement in the measurement of $ToF_f$ simultaneously with the emission of the second pulsed light (step S106). Note that the ambient light intensity $A_{in}$ at the start of the second measurement range is higher than that in the case of FIG. 2 described in the present embodiment. This is because the influence of the first reflected light received by the light receiving unit 102 in the measurement of $ToF_c$ remains. The control unit 111 determines the threshold value $S_{tf}$ on the basis of the intensity $A_{in}$ (step S107).

Accordingly, in the case where the measurement of $ToF_c$ has been complete, the electronic apparatus 100 may measure $ToF_f$ even within the first measurement range. The operation after the measurement of $ToF_f$ in the electronic apparatus 100 (steps S108 to S112) is similar to that in the present embodiment, and descriptions thereof will be omitted.

In the present embodiment, the pulse width $PW_c$ of the first pulsed light and the pulse width $PW_f$ of the second pulsed light are the same. Hereinafter, the pulse width of the first pulsed light is also referred to as a first pulse width, and the pulse width of the second pulsed light is also referred to as a second pulse width. As a variation, the control unit 111 may command the light source 101 to have a second pulse width $PW_{f2}$ different from the first pulse width $PW_c$.

Figure 8:
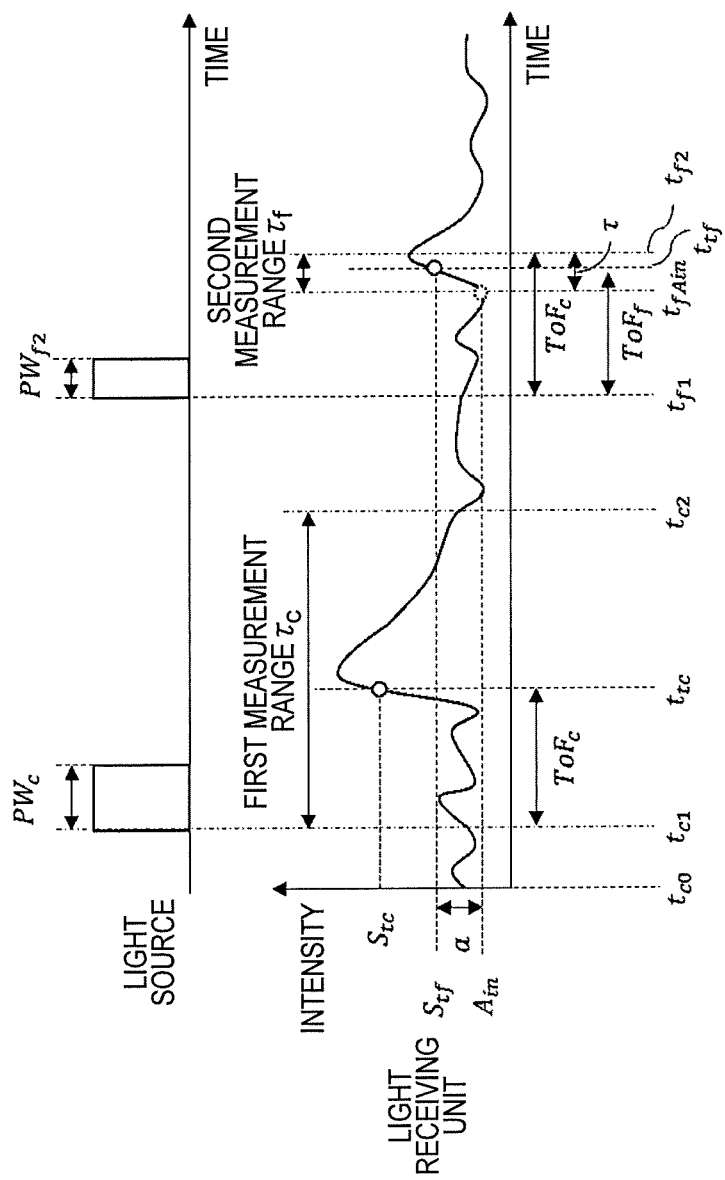
FIG. 8 is a diagram for illustrating a change of a pulse width of second pulsed light performed by the electronic apparatus.

An exemplary case where the control unit 111 commands the light source 101 to have a second pulse width shorter than the first pulse width will be described with reference to FIG. 8. Note that the operation of the electronic apparatus 100 is similar except for the change of the pulse width performed by the control unit 111, and thus descriptions thereof will be omitted.

In step S105, the control unit 111 commands the light source 101 to emit the second pulsed light with the second pulse width $PW_{f2}$. The second pulse width $PW_{f2}$ is shorter than the first pulse width $PW_c$. With the pulsed light having the second pulse width $PW_{f2}$ being emitted by the light source 101, the emission time becomes shorter. With the emission time being shortened, the energy of the reflected light is reduced, and the output of the light receiving unit 102 is reduced. However, since "a" can be set to a small value in setting the threshold value $S_{tf}$, it is highly likely that even the reflected light with reduced energy may exceed the threshold value $S_{tf}$. That is, the measurement unit 103 can determine the reflected light in a similar manner to the present embodiment.

The shortening of the second pulse width leads to the measurement of $ToF_f$ in which the power of light emitted by the light source 101 is suppressed. The upper limit of the average power of light to be emitted from the light source is determined from the eye-safe perspective and the like. When the power of light in one distance measurement can be suppressed, the number of distance measurement operations can be increased, which leads to improvement in the accuracy of distance measurement.

As a further variation, in the case where the pulse width is changed in such measurement of $ToF_c$ and measurement of $ToF_f$, the method of determining the second pulse width will be described with reference to FIGS. 9 and 10.

Figure 9:
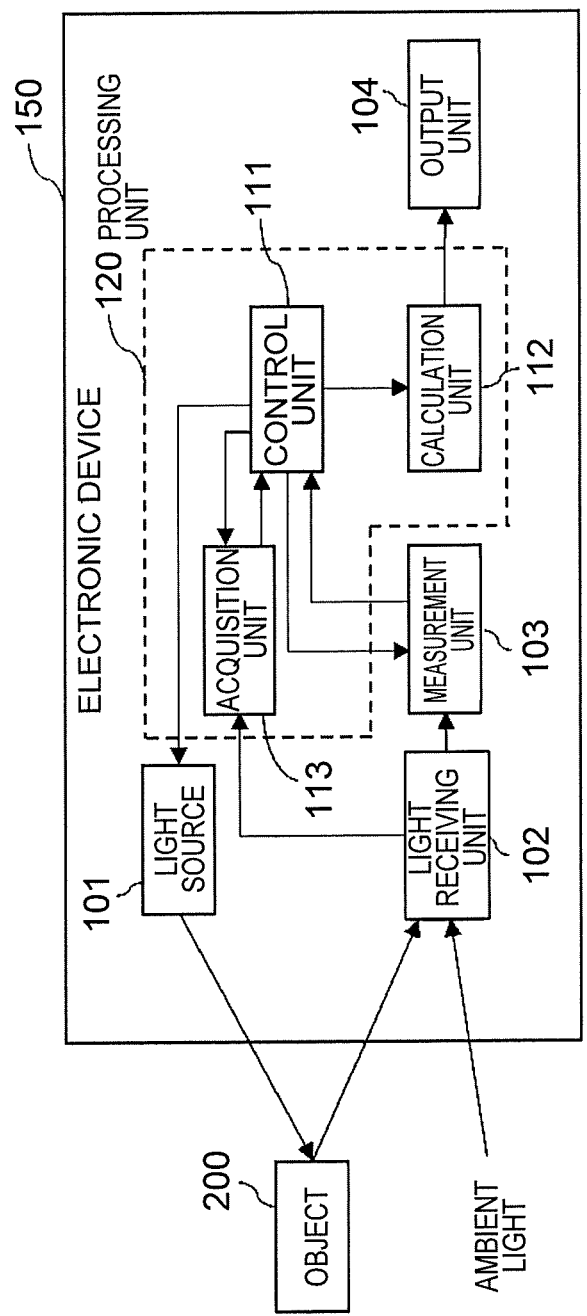
FIG. 9 is a diagram of a distance measurement system including a configuration of an electronic apparatus that can be applied to the first embodiment.
Figure 10:
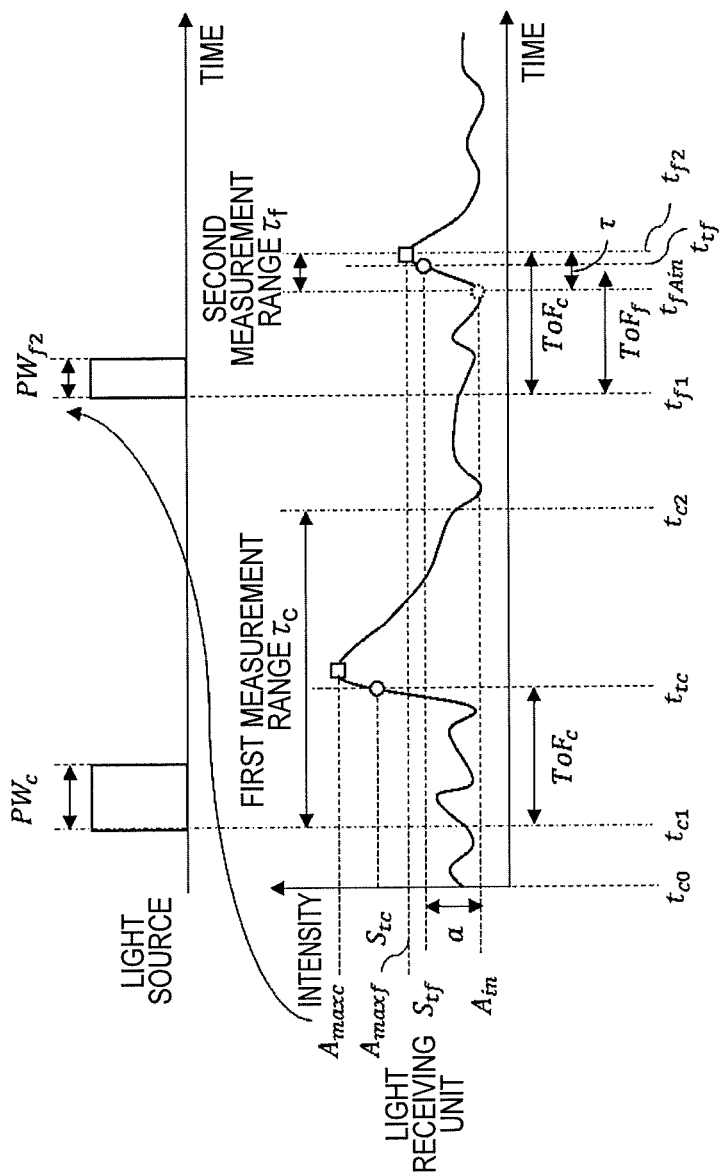
FIG. 10 is another diagram for illustrating a change of the pulse width of the second pulsed light performed by the electronic apparatus.

FIG. 9 illustrates a distance measurement system including a configuration of an electronic apparatus (electronic device) 150 in the case of changing the pulse width in the measurement of $ToF_c$ and the measurement of $ToF_f$. The electronic apparatus 150 includes an acquisition unit 113 in a processing unit 120 in addition to the electronic apparatus 100. Among components included in the electronic apparatus 150, the components included in the electronic apparatus 100 are denoted by the same reference signs, and descriptions thereof will be omitted.

The acquisition unit 113 obtains the maximum intensity among the intensity of the signals in the measurement range. In this case, the maximum intensity among the intensity of the signals in the first measurement range is obtained. The acquisition unit 113 may also similarly obtain the maximum intensity in the second measurement range. The measurement range is transmitted from the control unit 111, and the signals indicating the intensity of the light received by the light receiving unit 102 is transmitted from the light receiving unit 102. The maximum intensity obtained by the acquisition unit 113 is transmitted to the control unit 111 and is used to determine the second pulse width.

Since the operation of the electronic apparatus 150 in the measurement of $ToF_c$ is similar to that of the electronic apparatus 100 described in the present embodiment, differences will be mainly described. Note that the light receiving unit 102 transmits the signals indicating the intensity of the received light to the acquisition unit 113 in addition to the measurement unit 103.

The control unit 111 also notifies the acquisition unit 113 of the first measurement range as a command in step S101. Further, the control unit 111 commands the acquisition unit 113 to transmit, to the control unit 111, the maximum intensity within the first measurement range among the signals transmitted from the light receiving unit 102.

Since the measurement of $ToF_c$ is performed in a similar manner to the present embodiment, descriptions thereof will be omitted. In the measurement of $ToF_c$ in step S104, the acquisition unit 113 obtains, among the signals transmitted from the light receiving unit 102 after the first measurement range, the maximum intensity $A_{maxc}$ within the first measurement range. The acquisition unit 113 transmits the obtained intensity $A_{maxc}$ to the control unit 111. Furthermore, as a variation, the difference between the intensity $A_{maxc}$ and the intensity average value $A_{ave}$ may be transmitted to the control unit 111 instead of the intensity $A_{maxc}$.

The control unit 111 determines the second pulse width $PW_{f2}$ in step S105 on the basis of the intensity $A_{maxc}$. For example, the control unit 111 may determine the second pulse width $PW_{f2}$ according to a formula (4).

[Formula 4]

$$PW_{f2} = \frac{PW_c \times A_{maxft}}{A_{maxc}} \qquad (4)$$

Here, $A_{maxft}$ represents a theoretical value of the intensity $A_{maxf}$ that is the maximum within the second measurement range in the measurement of $ToF_f$. Although the method of determining $A_{maxft}$ is optional, it is the intensity required in the measurement of $ToF_f$. For example, the control unit 111 may set a specific value as $A_{maxft}$, determine $A_{maxf}$ on the basis of the threshold value $S_{tc}$, or, in the case where the ambient light intensity is estimated in the measurement of $ToF_c$, use the estimated intensity.

The control unit 111 can determine the second pulse width $PW_{f2}$ as described above. The subsequent measurement of $ToF_f$ is performed in a similar manner to the present embodiment, and thus descriptions thereof will be omitted. Note that the acquisition unit 113 may obtain the maximum intensity also within the second measurement range, which is represented as $A_{maxf}$ in FIG. 10. The control unit 111 may correct $A_{maxft}$ from the $A_{maxf}$.

As a further variation, the time length $T_f$ of the second measurement range can also be determined in addition to the second pulse width $PW_{f2}$ on the basis of the $A_{maxc}$ obtained by the acquisition unit 113. Hereinafter, a method of determining the time length $T_f$ of the second measurement range on the basis of $A_{maxc}$ will be described with reference to FIG. 11.

Figure 11:
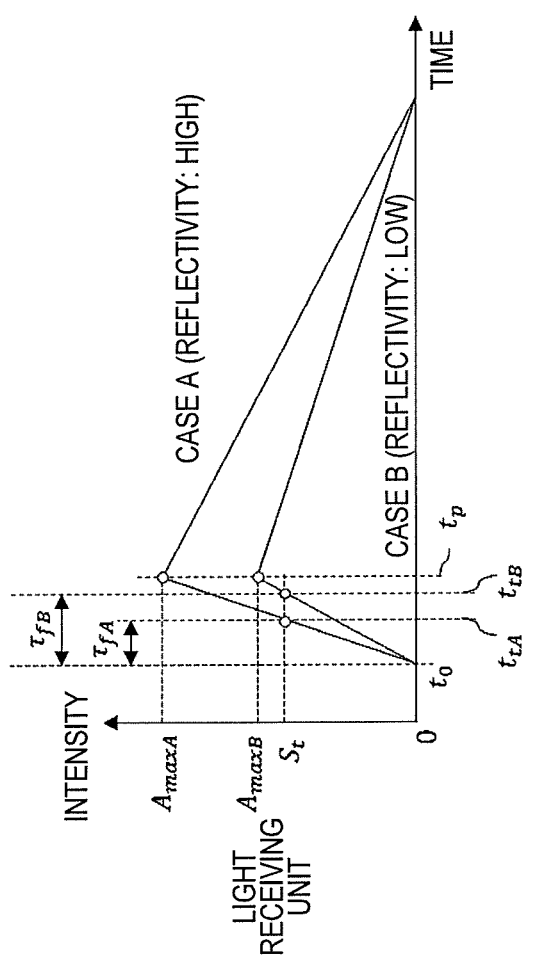
FIG. 11 is a diagram for illustrating determination of a time length of a second measurement range using the maximum value within a first measurement range.

For the sake of explanation, FIG. 11 illustrates the intensity of reflected light in an environment in which ambient light is not considered. A case where the reflectivity of the object by which the pulsed light is reflected is high is represented as a case A, and a case where the reflectivity of the object is low is represented as a case B. The time at which the pulsed light is emitted is set to 0, and time $t_0$ is set as a true value of the arrival time of the reflected light. The true value is a value with which the distance between the electronic apparatus 150 and the object can be accurately calculated when calculation is carried out using the formula (1) with this $t_0$ as the ToF. Time $t_p$ is the time at which the intensity of the reflected light in the two cases reaches the peak. In FIG. 11, the threshold value of intensity is set to St. Note that the emitted pulsed light is assumed to be similar in both two cases. In addition, it is assumed that the measurement range in which the acquisition unit 113 obtains the maximum value of the intensity includes at least the time 0 and the time $t_p$.

The acquisition unit 113 obtains intensity $A_{maxA}$ in the case A, and obtains intensity $A_{maxB}$ in the case B. Further, the measurement unit 103 measures the time at which the threshold value $S_t$ is reached or exceeded as $t_{tA}$ in the case A and $t_{tB}$ in the case B.

The purpose of measuring $ToF_f$ is to approach the time $t_0$, which is a true value. Accordingly, the control unit 111 determines a time $T_{fA}$ from the time $t_0$ to the time $t_{tA}$ as a time length of the second measurement range in the case A, and determines a time $T_{fB}$ from the time $t_0$ to the time $t_{tB}$ as a time length of the second measurement range in the case B.

As described above, the control unit 111 measures a threshold value $S_{tn}$ (n is a natural number of 1 or more) and $T_{fn}$ corresponding to $A_{maxn}$ in advance. The relationship between the $S_{tn}$, $A_{maxn}$, and $T_{fn}$ may be expressed by a formula, or by a look-up table. Furthermore, the measurement may be performed by experiment or simulation.

In the measurement of $ToF_c$, the control unit 111 may determine the second measurement range on the basis of the relationship between the maximum intensity $A_{maxc}$, $S_{tn}$, $A_{maxn}$, and $T_{fn}$ within the first measurement range transmitted from the acquisition unit 113.

Note that, although the diagram of FIG. 11 is based on an environment in which ambient light is not considered for the sake of explanation, it is also similarly applicable to an environment in which ambient light exists.

In the present embodiment, in steps S101 and S105, the command to start the measurement of the measurement unit 103 is transmitted from the control unit 111. As a variation, the pulsed light emitted from the light source 101 may be partially reflected, and a command to start the measurement may be transmitted upon reception of the light. This is applicable to both the first pulsed light and the second pulsed light. In this case, a command to start the measurement shifts to steps S102 and S106.

Figure 12:
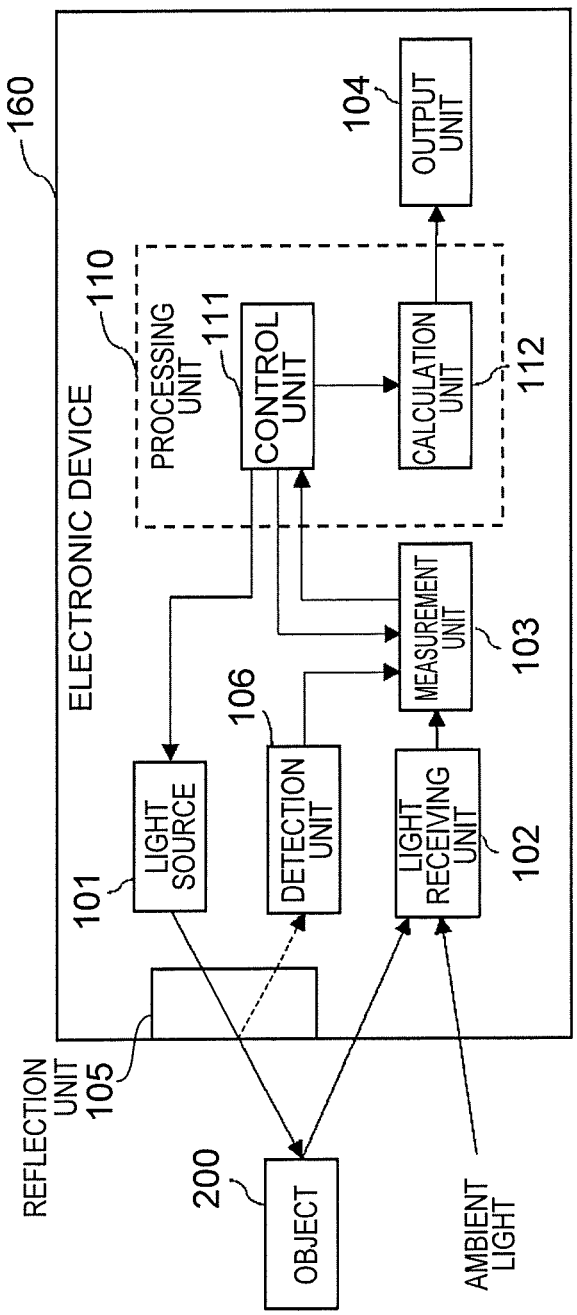
FIG. 12 is another diagram of the distance measurement system including a configuration of the electronic apparatus that can be applied to the first embodiment.

A distance measurement system including such an electronic apparatus 160 will be described with reference to FIG. 12. In addition to the electronic apparatus 100, the electronic apparatus 160 includes a reflection unit 105, and a detection unit 106. Among components included in the electronic apparatus 160, the components included in the electronic apparatus 100 are denoted by the same reference signs, and descriptions thereof will be omitted.

The reflection unit 105 partially reflects the pulsed light emitted from the light source 101, and transmits the remaining pulsed light.

The detection unit 106 detects the pulsed light reflected by the reflection unit 105, and transmits, to the measurement unit 103, signals indicating that the light source 101 has emitted the pulsed light. The measurement unit 103 that has received the signals starts time measurement. As the detection unit 106, the device described in the light receiving unit 102 is applicable. Note that, in the electronic apparatus 160, the control unit 111 does not transmit a command to start the time measurement to the measurement unit 103.

The operation of the electronic apparatus 160 is the same as the operation of the electronic apparatus 100 described in the present embodiment except that the detection unit 106 transmits a command to start time measurement to the measurement unit 103.

Further, the detection unit 106 may detect the pulsed light reflected by the reflection unit 105, and may transmit a command to start time measurement to the measurement unit 103. The detection unit 106 may transmit, to the control unit 111, signals indicating that the light source 101 has emitted the pulsed light or a command to start time measurement.

The control unit 111 that has received the signals or the command may transmit it to the measurement unit 103 to start time measurement. In the case where the signals or the command are not received from the detection unit 106 even when a predetermined period of time has elapsed from the time of the pulsed light emission, the control unit 111 may re-issue a command in the measurement of ToF, or the control unit 111 may cause the output unit 104 to output information notifying the user of an error.

With this arrangement, it becomes possible to cope with the case where the light source 101 does not emit pulsed light due to failure or the like.

In the present embodiment, the measurement unit 103 recognizes, using the DTC, the start time of the time measurement, and the start time and the end time of the first and second measurement ranges. As a variation, instead of the DTC, clock signals (hereinafter referred to as a clock) may be used to recognize time. The operation of the electronic apparatus 100 in the case of using the clock will be described with reference to FIGS. 13 to 15.

Figure 13:
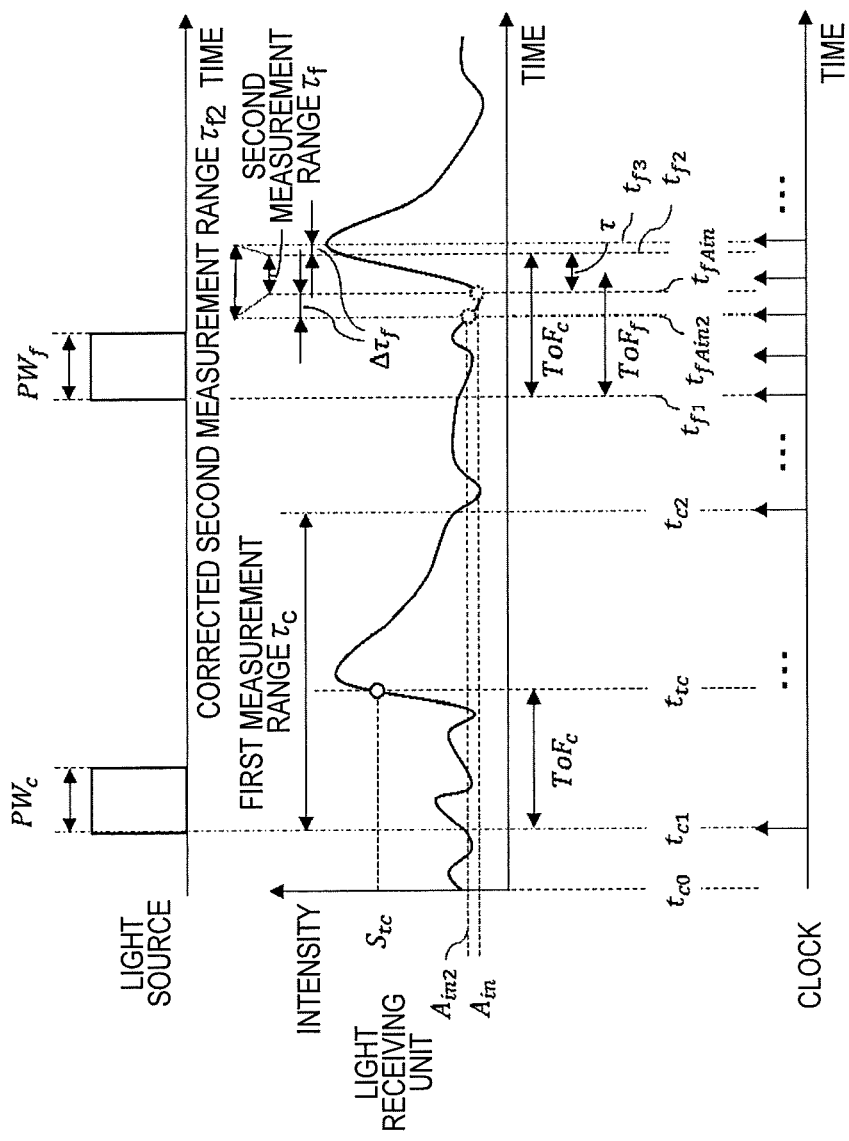
FIG. 13 is a diagram for illustrating operation of the electronic apparatus in measuring ToF using a clock.

FIG. 13 is a diagram for illustrating determination of the second measurement range using a clock as an example. The clock is output from a signal unit in the electronic apparatus 100. The signal unit may be a clock circuit, or may be a clock of a system loaded in the electronic apparatus 100. Further, the clock may be an integer clock, or a few clocks of multiphase clocks may be used. Furthermore, the signal unit may be provided outside the electronic apparatus 100, and a clock may be input to the electronic apparatus 100.

FIG. 13 illustrates a case where the timings of the start and the end of the time measurement is controlled using a clock. Those timings are synchronized with the output of the clock.

In a similar manner to the present embodiment, the operation of the electronic apparatus 100 using a clock will be described. Note that the measurement of $ToF_c$ and $ToF_f$ is performed using the TDC in a similar manner to the present embodiment. Further, as an example, it is assumed that the clock circuit is included in the measurement unit 103.

In step S101, the control unit 111 commands the light source 101 and the measurement unit 103 in a similar manner to the present embodiment. The control unit 111 commands the light source 101 to emit pulsed light at the time $t_{c1}$. The control unit 111 commands the measurement unit 103 to start time measurement at the time $t_{c1}$. Further, the control unit 111 issues, to the measurement unit 103, a command with a time from the time $t_{c1}$ to the time $t_{c2}$ as a first measurement range. The time $t_{c1}$ and the time $t_{c2}$ are set in the clock circuit.

In step S102, the light source 101 emits pulsed light at the time $t_{c1}$. The measurement unit 103 recognizes that it is the time $t_{c1}$ on the basis of the clock output from the clock circuit, and starts time measurement.

The operation of the electronic apparatus 100 up to steps S103 and S104 is similar to that in the present embodiment, and thus descriptions thereof will be omitted. Note that, at the time $t_{c2}$, the measurement unit 103 recognizes that it is the time $t_{c2}$ on the basis of the clock output from the clock circuit in step S104, and terminates the time measurement.

When the measurement of $ToF_c$ performed by the measurement unit 103 is terminated, the $ToF_c$ is transmitted to the control unit 111. While the control unit 111 determines the second measurement range on the basis of the $ToF_c$ in step S105, the second measurement range determined in a similar manner to the present embodiment may not match the clock. FIG. 13 illustrates a case where the second measurement range does not match the start-up of the clock. That is, the clock is not output at the start time $t_{fAin}$ and the end time $t_{f2}$ of the second measurement range.

In this case, the control unit 111 corrects the second measurement range, and determines a corrected second measurement range. Specifically, the control unit 111 extends the second measurement range to the output time of the clock closest in the direction of expansion. That is, in the corrected second measurement range, the start time is $t_{fAin2}$, the end time is $t_{f3}$, and the time length is $T_{f2}$.

Note that the control unit 111 may set the time at which the clock closest to the start time $t_{fAin}$ and the end time $t_{f2}$ of the second measurement range as the start time $t_{fAin2}$ and the end time $t_{f3}$ of the corrected second measurement range. In that case, it is not necessary to extend the second measurement range to the output time of the clock closest in the direction of expansion.

The control unit 111 commands the light source 101 and the measurement unit 103 in a similar manner to the present embodiment. The control unit 111 issues a command to emit pulsed light at the time $t_{f1}$. The control unit 111 commands the measurement unit 103 to start time measurement at the time $t_{f1}$. Further, the control unit 111 issues, to the measurement unit 103, a command with a time from the time $t_{fAin2}$ to the time to, which is the corrected second measurement range, as a measurement range. The times $t_{f1}$, $t_{fAin2}$, and $t_{f3}$ are set in the clock circuit.

In step S106, the light source 101 emits pulsed light at the time $t_{f1}$. The measurement unit 103 recognizes that it is the time $t_{f1}$ on the basis of the clock output from the clock circuit, and starts time measurement.

In step S107, at the time $t_{fAin2}$, the measurement unit 103 recognizes that it is the time of the starting end of the corrected second measurement range on the basis of the clock output from the clock circuit. The measurement unit 103 transmits, to the control unit 111, the intensity $A_{in2}$ of the signals at the time $t_{fAin2}$. While the control unit 111 determines the threshold value $S_{tf}$ on the basis of the intensity $A_{in2}$, it further determines the threshold value $S_{tf}$ also on the basis of a difference $\Delta T_f$ between the time length $T_f$ of the second measurement range and the time length $T_{f2}$ of the corrected second measurement range. The determination of the threshold value $S_{tf}$ will be described later.

The operation after step S108 is similar to the operation described in the present embodiment, and thus descriptions thereof will be omitted. Note that, at the time $t_{f3}$, the measurement unit 103 recognizes that it is the time of the end of the corrected second measurement range on the basis of the clock output from the clock circuit in step S109, and terminates the time measurement.

The determination of the threshold value $S_{tf}$ based on the intensity $A_{in2}$ and the difference $\Delta T_f$, which is performed by the control unit 111, will be described with reference to FIGS. 14 and 15.

As the difference $\Delta T_f$ becomes larger, the corrected second measurement range becomes wider. As the measurement range becomes wider, the probability that the light receiving unit 102 receives ambient light with high intensity increases. Therefore, the control unit 111 determines the threshold value $S_{tf}$ to be higher as the difference $\Delta T_f$ becomes larger.

The magnitude of the difference $\Delta T_f$ is at least based on the output interval of the clock. FIG. 14 illustrates a case where the output interval of the clock is Int1. The magnitude of the difference $\Delta T_f$ in this case is assumed to be a difference $\Delta T_{f1}$. The control unit 111 determines a threshold value $S_{tf2}$ from a value a2 at least based on the intensity $A_{in2}$ and the difference $\Delta T_{f1}$.

Figure 15:
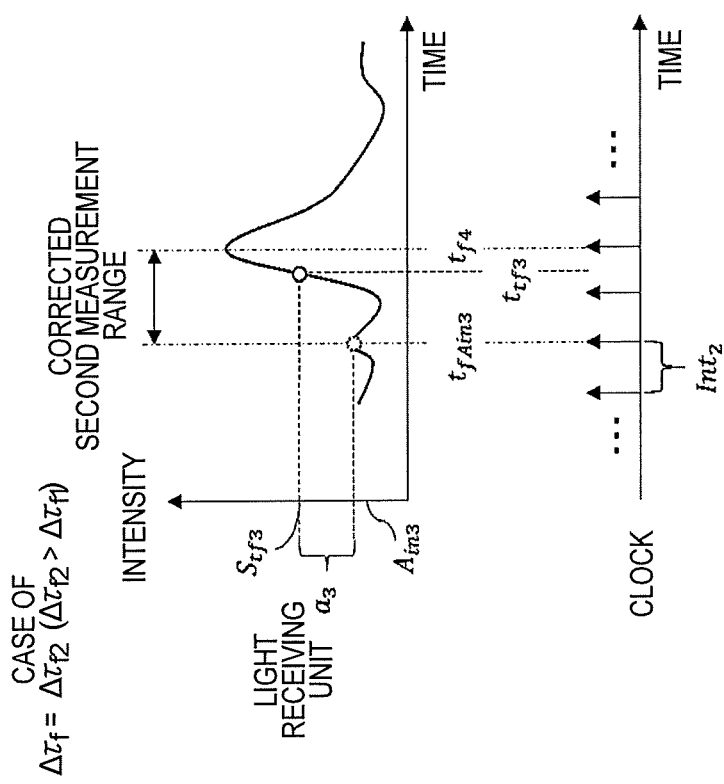
FIG. 15 is a diagram for illustrating the threshold value for the measurement of $ToF_f$ determined on the basis of the corrected second measurement range wider than the case of FIG. 14.

Meanwhile, FIG. 15 illustrates a case where the output interval of the clock is Int2. The magnitude of the difference $\Delta T_f$ in this case is assumed to be a difference $\Delta T_{f2}$. The interval Int2 is larger than the interval Int1, and the difference $\Delta T_{f2}$ is larger than the difference $\Delta T_{f1}$. The control unit 111 determines a threshold value $S_{tf3}$ from a value a3 at least based on intensity $A_{in3}$ and the difference $\Delta T_{f2}$.

Figure 14:
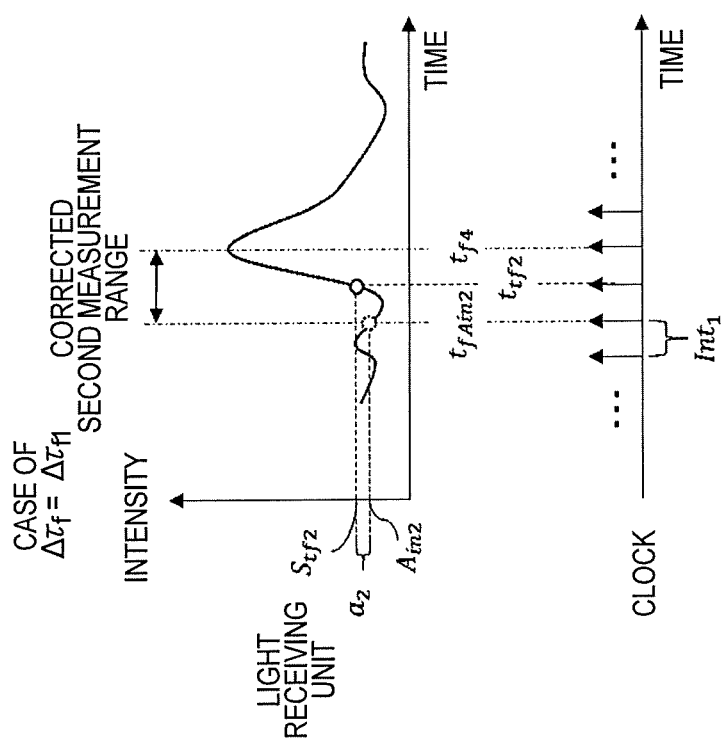
FIG. 14 is a diagram for illustrating a threshold value for measurement of $ToF_f$ determined on the basis of a corrected second measurement range.

The corrected second measurement range in FIG. 15 is wider than the corrected second measurement range in FIG. 14, whereby the probability that the light receiving unit 102 receives ambient light with high intensity increases. Therefore, the control unit 111 sets a3 to be larger than a2, and sets the threshold value $S_{tf3}$ to be higher than the threshold value $S_{tf2}$.

With the ToF being measured using a clock, it becomes possible to reduce the DTC included in the measurement unit 103, and the electronic apparatus 100 can be downsized.

Although the case without using the DTC has been described in the variation, the clock and the DTC may be used in combination. Furthermore, as described with reference to FIGS. 14 and 15, it is not limited to the frequency band or the start-up interval of the clock, and is applicable to an optional frequency band or start-up of the clock.

The present embodiment and the variations have been described above. Next, examples of application of the electronic apparatus 100 described in the present embodiment will be described below.

In the present embodiment, the electronic apparatus 100 calculates the distance d to the object 200. As an example of application, the electronic apparatus 100 emits pulsed light in various directions and receives reflected light to calculate ToF, thereby making it possible to create a layout showing the arrangement of objects around the electronic apparatus 100.

Figure 16:
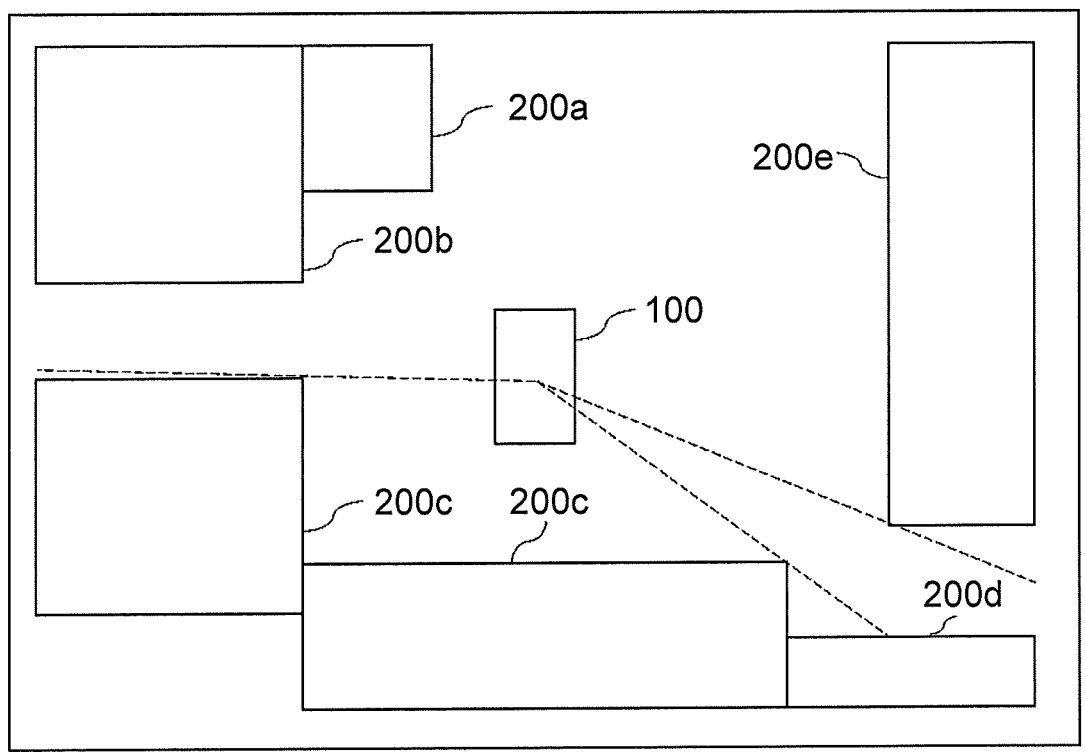
FIG. 16 is a diagram for illustrating arrangement of objects in two dimensions.

A case where the electronic apparatus 100 creates the layout will be described with reference to FIG. 16. In FIG. 16, objects 200a to 200e are arranged around the electronic apparatus 100.

The electronic apparatus 100 emits pulsed light in various directions, and calculates the distances between the electronic apparatus 100 and the objects 200a to 200e in a similar manner to the present embodiment. The calculation unit 112 creates a layout showing the arrangement of the surrounding objects on the basis of the distance.

Figure 17:
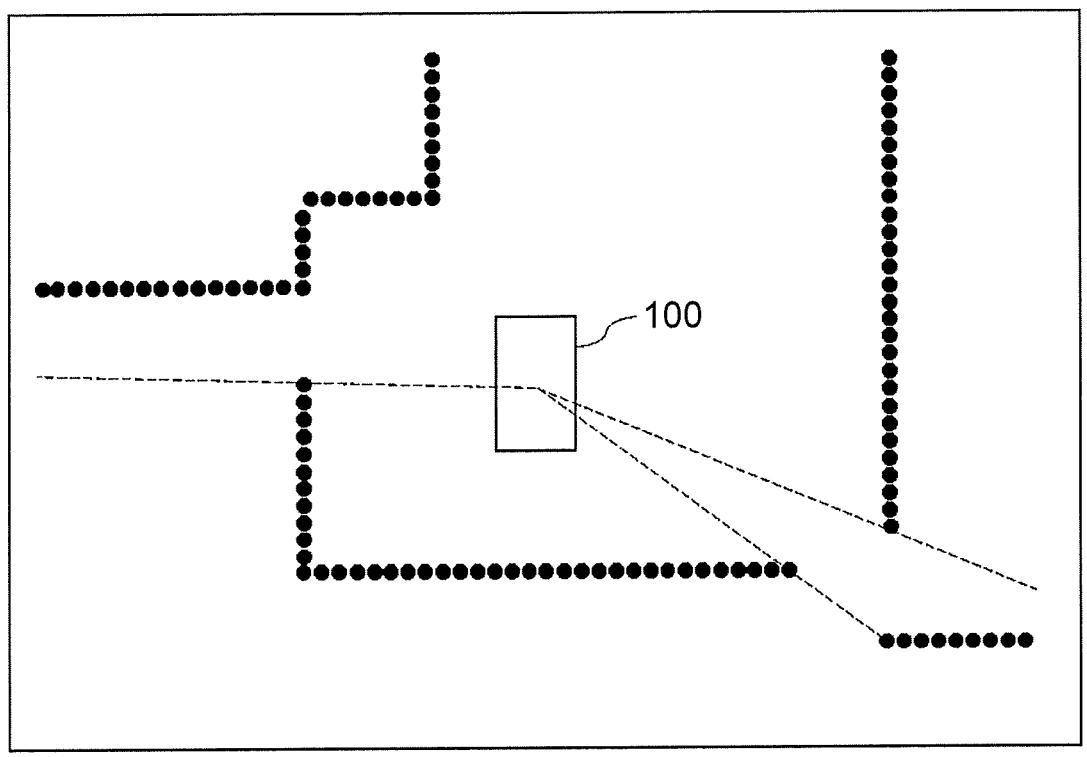
FIG. 17 is a diagram for illustrating a layout of objects in two dimensions.

An example of the created layout is illustrated in FIG. 17. The calculation unit 112 can plot points at the coordinates of the objects 200a to 200e to create a layout of the objects 200a to 200e.

Information regarding the coordinates included in the points may be orthogonal coordinates, polar coordinates, absolute coordinates (world coordinates), or relative coordinates. As the relative coordinates, for example, the center of gravity of the electronic apparatus 100 may be used as a reference, or the position of the light source 101 may be used as a reference. In addition, a means for displaying the information regarding the coordinates is not limited to points, but may be vectors.

In the layout, for example, a mobile object that performs autonomous operation, on which the electronic apparatus 100 is mounted, is used to control a power unit. In addition, by adding location information to the layout and using it as obstacle data, the mobile object that performs autonomous operation can easily obtain the data to use it. The acquisition of the location information can use an existing method.

Although the layout illustrated in FIG. 17 is a plane surface, a three-dimensional space (real space) at three-dimensional points may be shown. An example of the layout in the three-dimensional space will be described with reference to FIGS. 18 and 19.

FIG. 18 illustrates that objects 200f and 200g are arranged around the electronic apparatus 100. The electronic apparatus 100 emits pulsed light in various directions, and calculates the distances between the electronic apparatus 100 and the objects 200f and 200g in a similar manner to the present embodiment. The calculation unit 112 creates a layout showing the arrangement of the surrounding objects on the basis of the distance.

Figure 19:
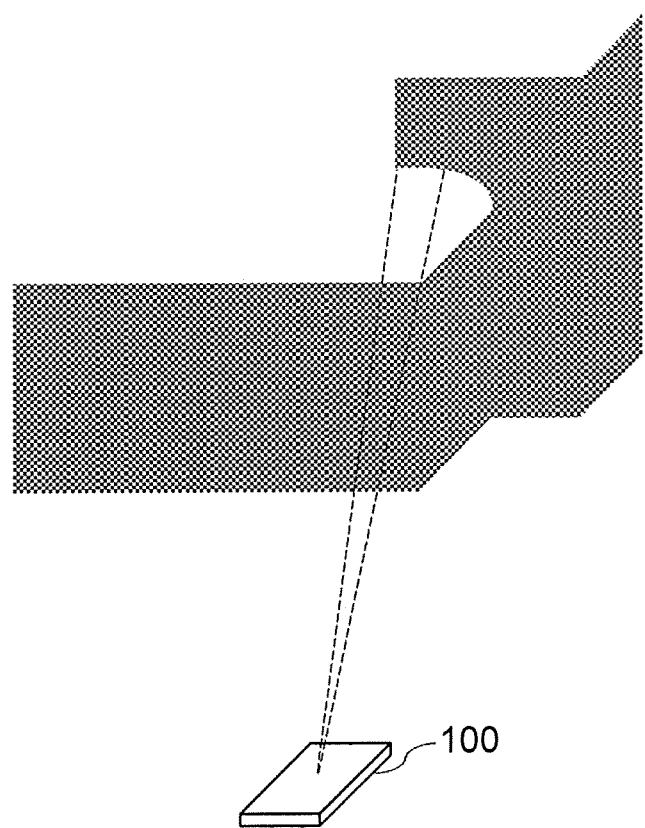
FIG. 19 is a diagram for illustrating a layout of objects in three dimensions.

An example of the created layout is illustrated in FIG. 19. The calculation unit 112 can plot points at the coordinates of the objects 200f and 200g to create a layout of the objects 200f and 200g.

In a similar manner to the case of the two-dimensional layout, information regarding the coordinates included in the three-dimensional points may be orthogonal coordinates, polar coordinates, absolute positions (world positions), or relative positions. As the relative positions, for example, the center of gravity of the electronic apparatus 100 may be used as a reference, or the position of the light source 101 may be used as a reference. In addition, a means for displaying the information regarding the coordinates is not limited to three-dimensional points, but may be three-dimensional vectors.

In a similar manner to the two-dimensional layout, in the three-dimensional layout as well, location information may be added to be used as obstacle data.

The calculation unit 112 may transmit the created layout to the output unit 104, or may cause the storage device described in the present embodiment to retain it. In a similar manner to the distance d described in the present embodiment, the output unit 104 outputs it to an output destination.

Furthermore, an example of application of the layout is not limited to the position of an object. For example, a state in vivo can be expressed in a three-dimensional view when it is applied to an endoscope, and a state of a construction can be expressed in a two-dimensional view or a three-dimensional view when it is applied to a construction. The state in vivo is, for example, the arrangement of organs, the presence or absence of swellings, depressions, holes, and tumors, and the like. The state of a construction is, for example, no abnormality, cracks, unevenness, holes, deflection, and the like. Note that those examples are also included in the layout.

Figure 20:
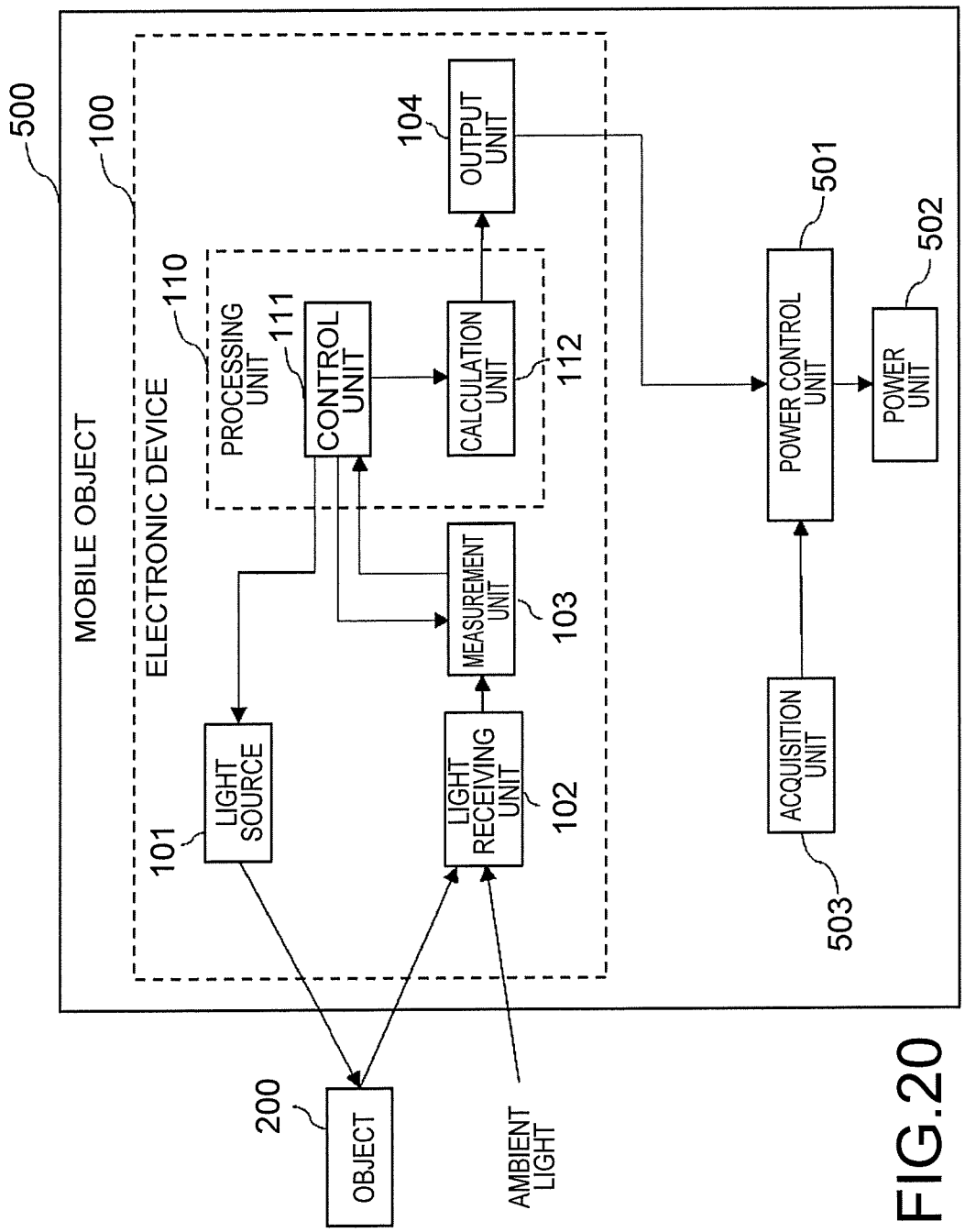
FIG. 20 is a configuration diagram of a mobile object including the electronic apparatus.

As a further example of application, a mobile object that moves using the layout will be described. An example of the mobile object is illustrated in FIG. 20. A mobile object 500 is a movable object, which is, for example, a vehicle, a wagon, a flyable object (manned plane and unmanned plane (e.g., unmanned aerial vehicle (UAV) and drone)), a robot (including an endoscope with a movable distal end), or the like. In addition, the mobile object 500 is, for example, a mobile object that travels through driving operation by a person, or a mobile object capable of automatically (autonomously) traveling without driving operation by a person. An exemplary case where the mobile object 500 is a four-wheeled vehicle capable of autonomously traveling will be described below.

In addition to the electronic apparatus 100, the mobile object 500 includes a power control unit 501, a power unit 502, and an acquisition unit 503. Further, the output unit 104 transmits the layout created by the calculation unit 112 to the power control unit 501.

The power control unit 501 commands the power unit 502 to drive. More specifically, the power control unit 501 determines a direction, speed, and acceleration in which the mobile object 500 moves on the basis of the layout transmitted from the output unit 104 and the information transmitted from the acquisition unit 503, and commands the power unit 502 to drive such that the direction, the speed, and the acceleration are implemented.

By the command of the power control unit 501, an accelerating amount, a braking amount, a steering angle, and the like of the mobile object 500 are controlled. For example, the power control unit 501 controls the drive of the mobile object 500 such that, while objects such as obstacles are avoided, the ongoing lane is maintained and an inter-vehicular distance of a predetermined distance or more is maintained with a preceding vehicle.

The power unit 502 is a driving device mounted on the mobile object 500. The power unit 502 is, for example, an engine, a motor, a wheel, or the like. The power unit 502 is driven by a command of the power control unit 501 to drive the mobile object 500.

The acquisition unit 503 obtains various kinds of information necessary for autonomous traveling. That is, for example, location information of the mobile object 500, an image around the mobile object 500, relative location information transmitted from mobile objects around the mobile object 500, and the like. In order to obtain those various kinds of information, the acquisition unit 503 includes any device such as a millimeter-wave radar sensor, a sonar sensor for detecting an object using sound waves, an ultrasonic sensor, a stereo camera, a monocular camera, and a wired or wireless communication device.

Note that the power control unit 501 is mounted as a processor or the like described in the present embodiment. The power control unit 501 and the acquisition unit 503 may be mounted on one chip, or may be mounted separately. Furthermore, the power control unit 501 and the acquisition unit 503 may be incorporated in the electronic apparatus 100. In that case, the power control unit 501 may be incorporated in the processing unit 110.

As described above, the mobile object 500 is capable of autonomously traveling while avoiding objects, such as obstacles, at least on the basis of the layout showing the arrangement of objects created by emitting pulsed light and receiving reflected light.

While the case of a four-wheeled vehicle capable of autonomously traveling has been described in the example of application, it is also possible to autonomously travel in a similar manner even in the case of other mobile objects mentioned as examples of the mobile object 500, although the power unit 502 is different.

For example, in the case where the mobile object 500 is a drone, the power unit 502 is a motor that rotates blades, and a motor that adjusts the angles of the blades. The power control unit 501 determines a rotating speed of the motor that rotates the blades, an angle of the motor that adjusts the angles of the blades, acceleration of each motor, and the like on the basis of the layout and the acquisition unit 503, and provides the power unit 502 with a command. The power unit 502 drives on the basis of the command of the power control unit 501, whereby the mobile object 500 can travel autonomously.

For example, in the case where the mobile object 500 is a robot, the power unit 502 is a motor that circles, rotates, and adjusts the angle of at least one of an arm and a leg. The arm is, for example, a robot arm or the like. Furthermore, in the case where the robot is an endoscope with a movable distal end, the movable portion is included in the arm. The leg may be, for example, a leg with a wheel and a joint. The power control unit 501 determines rotating speeds of the motors in the arm and the leg, angles of the motors, acceleration of each motor, and the like on the basis of the layout and the acquisition unit 503, and provides the power unit 502 with a command. The power unit 502 drives on the basis of the command of the power control unit 501, whereby the mobile object 500 can travel autonomously.

While the present embodiment, the variations, and the examples of application have been described above, those may be performed in combination.

Figure 21:
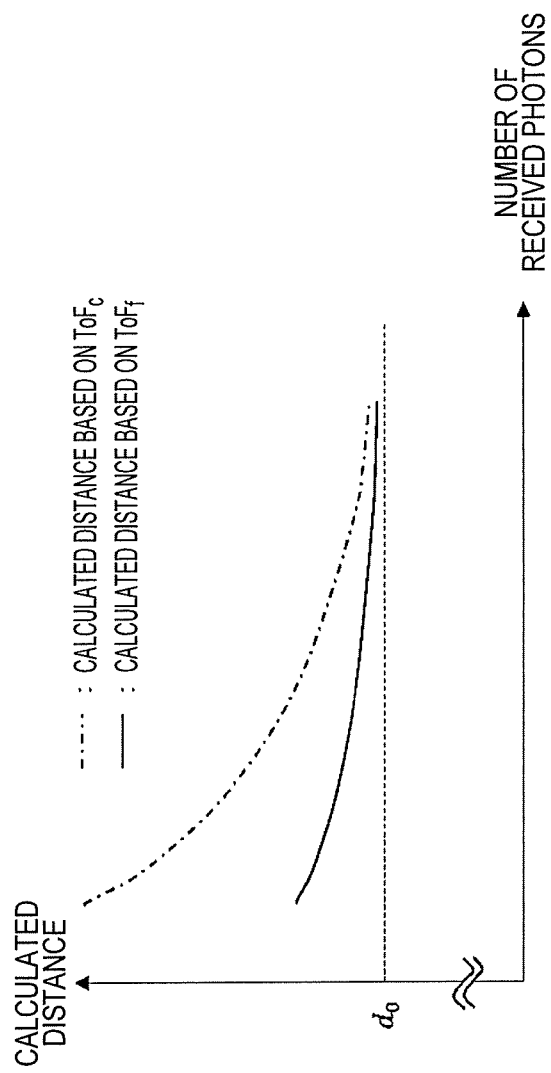
FIG. 21 is a graph for comparing a calculated distance based on $ToF_c$ with a calculated distance based on $ToF_f$.
Figure 22:
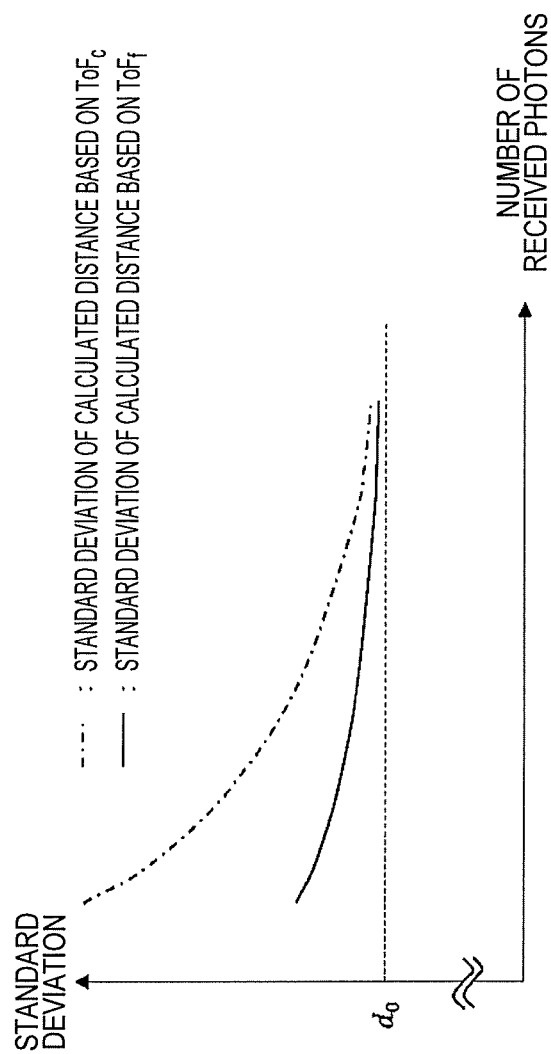
FIG. 22 is a graph for comparing standard deviation of the calculated distance based on $ToF_c$ with standard deviation of the calculated distance based on $ToF_f$.

The electronic apparatus according to the present embodiment is capable of improving the accuracy of ToF by measuring the ToF twice. With the distance d being calculated using the ToF, the accuracy of distance measurement can be improved. The improvement in the accuracy of the distance measurement also affects the number of photons received by the light receiving unit 102. FIG. 21 illustrates a distance calculated on the basis of $ToF_c$ and a distance calculated on the basis of $ToF_f$. Standard deviation is illustrated. FIG. 22 illustrates standard deviation of a distance calculated on the basis of $ToF_c$ and standard deviation of a distance calculated on the basis of $ToF_f$.

In FIG. 21, the distance d0 represents a true value of the distance between the electronic apparatus 100 and the object 200. The accuracy of distance measurement can be improved by measuring ToF twice regardless of the number of photons received by the light receiving unit 102.

In FIG. 22, the standard deviation of the distance d can be reduced and the accuracy of distance measurement can be improved by measuring ToF twice regardless of the number of photons received by the light receiving unit 102.

In FIGS. 21 and 22, it is applicable to, in addition to the number of photons received, any index related to brightness, such as luminance and illuminance.

Figure 23:
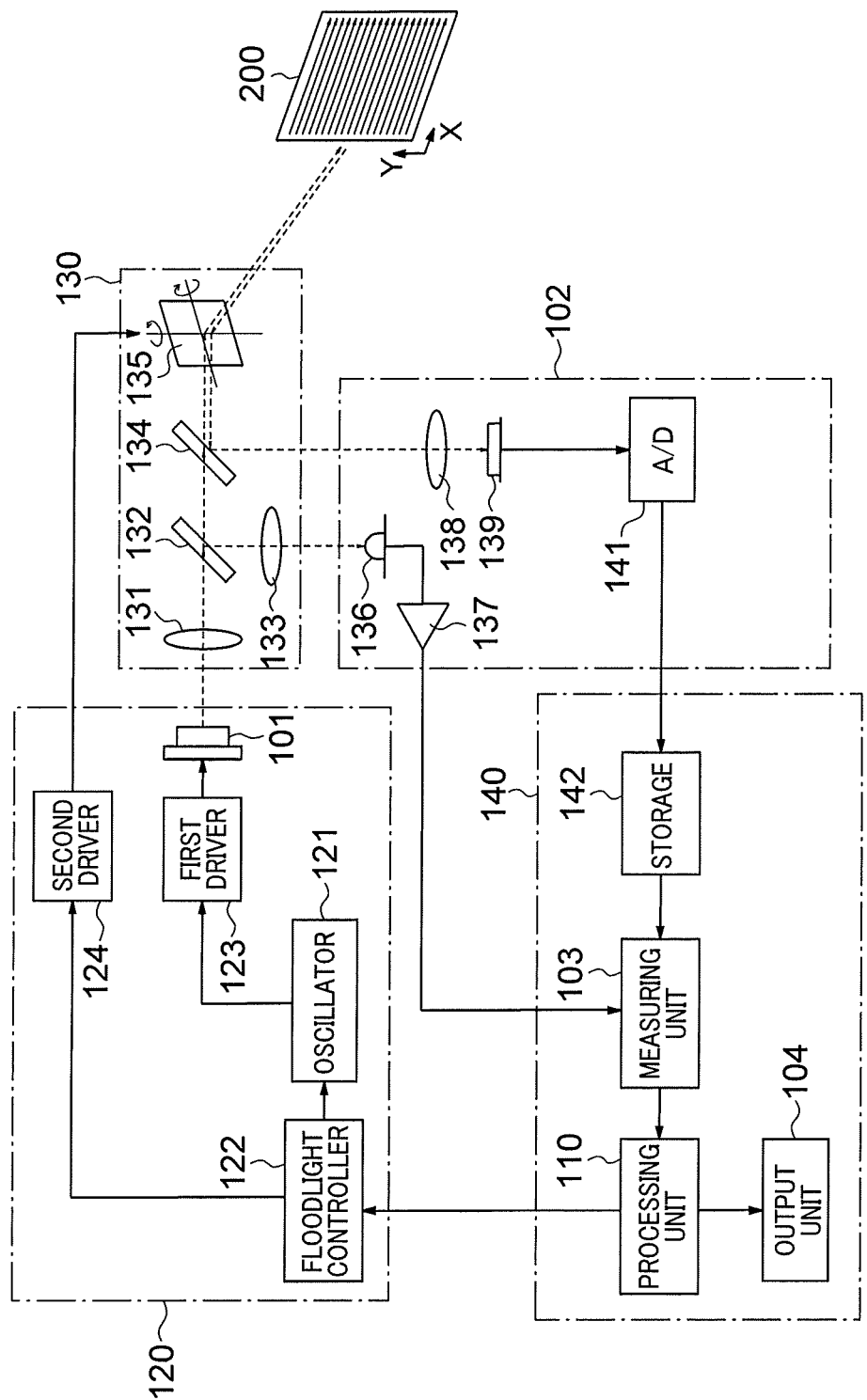
FIG. 23 is a block diagram showing a schematic configuration of a LiDAR apparatus provided with the electronic apparatus according to the present embodiment.

The electronic apparatus 100 according to the present embodiment can be implemented in a LiDAR (Light Detecting And Ranging) apparatus 150 used for autonomous operation or the like. FIG. 23 is a block diagram of showing a schematic configuration of the LiDAR apparatus 150 provided with the electronic apparatus according to the present embodiment.

The electronic apparatus 100 of FIG. 23 includes a floodlight unit 120, a light controller 130, a light receiving unit 102, and a signal processing unit 140. At least part of the electronic apparatus 100 of FIG. 23 can be configured with one or plurality of semiconductor ICs (Integrated Circuits). For example, at least partial components in the signal processing unit 140 may be integrated into one semiconductor chip or the light receiving unit 102 may also be integrated into the semiconductor chip. Moreover, the floodlight unit 120 may also be integrated into the semiconductor chip.

The floodlight unit 123 emits the above-described first pulsed light and second pulsed light alternately and cyclically as flood lights. The time from when the floodlight unit 123 emits the first pulsed light until when the floodlight unit 123 emits the second pulsed light is a period of time equal to or longer than the time required for the light receiving unit 102 to receive reflected light in accordance with the first pulsed light.

The floodlight unit 120 has an oscillator 121, a floodlight controller 122, a light source 101, a first driver 123, and a second driver 124. The oscillator 121 generates an oscillation signal in accordance with the period of emitting the first pulsed light and the second pulsed light as flood lights. The first driver 123 intermittently supplies power to the light source 101 in synchronism with the oscillation signal. The light source 101 intermittently emits the first pulsed light and the second pulsed light on a basis of the power from the first driver 123. The floodlight controller 122 controls the second driver 124 in synchronism with the oscillation signal. The second driver 124 supplies a drive signal to the light controller 130 in synchronism with the oscillation signal in response to a command from the floodlight controller 122.

The light controller 130 controls the travel direction of the first and second pulsed light emitted from the light source 101. Moreover, the light controller 130 controls the travel direction of received first and second pulsed light.

The light controller 130 has a first lens 131, a beam splitter 132, a second lens 133, a half mirror 134, and a scanning mirror 135.

The first lens 131 collects the first and second pulsed light emitted from the floodlight unit 120 and guides them to the beam splitter 132. The beam splitter 132 divides the first and second pulsed light from the first lens 131 in two directions and guides them to the second lens 133 and the half mirror 134 separately. The second lens 133 guides the divided light from the beam splitter 132 to the light receiving unit 102. The reason for guiding the first and second pulsed light to the light receiving unit 102 is that the light receiving unit 102 detects floodlighting timing.

The half mirror 134 passes the divided light from the beam splitter 132 to guide it to the scanning mirror 135. Moreover, the half mirror 134 reflects light including reflected light incident on the electronic apparatus 100 to the direction of the light receiving unit 102.

The scanning mirror 135 rotates the mirror surface in synchronism with a drive signal from the second driver 124 in the floodlight unit 120. In this way, the scanning mirror 134 controls the reflection direction of the divided light incident on the mirror surface of the scanning mirror 134. By controlling the rotation of the mirror surface of the scanning mirror 134 at a constant cycle, it is possible to scan the first and second pulsed light emitted from the light controller 130 at least in a one-dimensional direction. By providing two shafts in two directions for rotating the mirror surface, it is also possible to scan the first and second pulsed light emitted from the light controller 130 in a two-dimensional direction. FIG. 23 shows an example of scanning the first and second pulsed light emitted from the electronic apparatus 100 as floodlights in an X-direction and a Y-direction by the scanning mirror 135.

In the case where an object 10, such as a human or an object, is present in a scanning range of the first and second pulsed light emitted from the electronic apparatus 100 as floodlights, the first and second pulsed light are reflected by the object 10. At least part of the reflected light reflected by the object 10 propagates in the reverse direction through the passage almost the same as that of the first and second pulsed light and is incident on the scanning mirror 135 in the light controller 130. Although the mirror surface of the scanning mirror 135 is being rotated at a predetermined cycle, since the first and second pulsed light propagate at the speed of light, the reflected light from the object 10 is incident on the mirror surface while there is almost no change in the angle of the mirror surface of the scanning mirror 135. The reflected light from the object 10 incident on the mirror surface is reflected by the half mirror 134 and received by the light receiving unit 102.

The light receiving unit 102 has a light detector 136, an amplifier 137, a third lens 138, a photo-sensor 139, and an A/D converter 141. The light detector 136 receives light divided by the beam splitter 132 and converts it to an electric signal. The light detector 136 can detect the floodlighting timing of the first and second pulsed light. The amplifier 137 amplifies the electric signal output from the light detector 136.

The third lens 138 forms an image of the light reflected by the half mirror 134 on the photo-sensor 139. The photo-sensor 139 receives light and converts it to an electric signal. The photo-sensor 139 has the above-described SiPM (Silicon Photomultiplier).

The A/D converter 141 samples the electric signal output from the photo-sensor 139 at a predetermined sampling rate for A/D conversion to generate a digital signal.

The signal processing unit 140 measures the distance to the object 10 that reflected the first and second pulsed light and stores a digital signal in accordance with the intensity of received light in a storage 142. The signal processing unit 140 has the storage 142, a measuring unit 103, a processing unit 110, and an output unit 104. The storage 142 stores the digital signal A/D-converted by the A/D-converter 141. The measuring unit 103 reads out a digital signal corresponding to the light received by the light receiving unit 102 from the storage 142 to determine the light receiving timing and determine the distance to the object by means of the time difference from the floodlighting timing to the light receiving timing. The measuring unit 103 detects the floodlighting timing of the floodlight unit 120 via the light detector 136 and the amplifier 137. The floodlight unit 120 may notify the measuring unit 103 of information relating to the pulse widths of the first and second pulse lights.

As described above, the electronic apparatus according to the present embodiment measures ToF twice. The measurement ranges of ToF to be measured for the second time and the threshold value for detecting the reflected light are determined on the basis of the ToF measured for the first time. Accordingly, the accuracy of distance measurement can be improved.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An electronic apparatus capable of determining a distance to an object based on at least first reflected light provided by a reflection of first pulsed light on the object and second reflected light provided by a reflection of a second pulsed light on the object, comprising:
   an input terminal configured to receive an electrical signal indicating an intensity of reception light;
   processing circuitry configured to:
      specify, based on the electrical signal, a first duration from when the first pulsed light is emitted until when the first reflected light is received within a first measurement range;
      determine, based on the first duration, a second measurement range of the second reflected light;
      specify, within the second measurement range based on the electrical signal, a second duration from when the second pulsed light is emitted until when the second reflected light is received;
      determine the distance from the electronic apparatus to the object according to the second duration;
      determine the second measurement range shorter than the first duration;
      estimate first intensity of a light which does not include the second reflected light among the reception lights based on the electrical signal;
      determine a first threshold value for determining whether or not the reception light includes the second reflected light on a basis of the first intensity and a specific value; and
      determine the second reflected light on a basis of the first threshold value to measure the second duration.

2. The electronic apparatus according to claim 1, wherein the processing circuitry lowers a first threshold value that is compared with the intensity of reception light in determination of whether or not the second reflected light is received than a second threshold value that is compared with the intensity of reception light in determination of whether or not the first reflected light is received.

3. The electronic apparatus according to claim 1, wherein the processing circuitry is configured to:
   estimate second intensity that is average intensity of the reception light after the first pulsed light is emitted on the basis of the electrical signal; and
   determine a second threshold value for determining whether or not the reception light includes the first reflected light on a basis of the second intensity, and
   the processing circuitry determines the first reflected light on a basis of the second threshold value, and measures the first duration.

4. The electronic apparatus according to claim 3, wherein the processing circuitry determines at least one of the first threshold value and the second threshold value further on a basis of light reflectivity of the object.

5. The electronic apparatus according to claim 3, wherein the first intensity is estimated on a basis of, within the electrical signal, an electrical signal by photoelectric conversion of the reception light before the second measurement range.

6. The electronic apparatus according to claim 3, wherein the first threshold value is smaller than the second threshold value.

7. The electronic apparatus according to claim 1, further comprising:
an output unit configured to output a clock signal, wherein the second measurement range is determined further on a basis of the clock signal.

8. The electronic apparatus according to claim 1, wherein the processing circuitry is configured to:
acquire, among the intensity of the reception light, a maximum value of the intensity of light during a time from when the first pulsed light is emitted until when the second pulsed light is emitted on the basis of the electrical signals; and
determine the second measurement range further on a basis of the maximum value.

9. The electronic apparatus according to claim 1, wherein the processing circuitry is configured to:
acquire, among the intensity of the reception light, a maximum value of the intensity of light during a time from when the first pulsed light is emitted until when the second pulsed light is emitted; and
determine a pulse width of the second pulsed light on a basis of the maximum value.

10. The electronic apparatus according to claim 1, wherein
the processing circuitry determines a pulse width of the second pulsed light on a basis of light reflectivity of the object.

11. The electronic apparatus according to claim 1, wherein
a pulse width of the second pulsed light is equal to or less than a pulse width of the first pulsed light.

12. The electronic apparatus according to claim 1 comprising:
a light receiver that receives light and outputs the electric signal, wherein
the light receiver includes an avalanche photo diode, and outputs the electrical signals on a basis of a number of photons received by the avalanche photo diode.

13. The electronic apparatus according to claim 1, further comprising:
a light source that emits the first pulsed light and the second pulsed light;
a reflection unit that partially reflects the first pulsed light; and
a detector that notifies the processing circuitry of an emission timing of the first pulsed light reflected by the reflection unit, wherein
the processing circuitry measures the first duration on a basis of the notification from the detector.

14. The electronic apparatus according to claim 1, wherein
the specific value is set on a basis of a measured value of a received intensity of a specific light.

15. The electronic apparatus according to claim 1, wherein
the first intensity is an intensity of the reception light at a start time of measurement of the second reflected light.

16. The electronic apparatus according to claim 1, wherein
the processing circuitry creates a layout including information indicating a coordinate of the object on a basis of at least one of the time and the distance.

17. The electronic apparatus according to claim 16, further comprising:
a power control unit that determines a command for a power unit of a mobile object on a basis of the layout.

18. The electronic apparatus according to claim 1, further comprising:
an output unit that outputs at least one of information indicating the distance between the electronic apparatus and the object, information indicating the first duration, information indicating the second duration, and information including a layout.

19. The electronic apparatus according to claim 1, further comprising:
a scan controller configured to scan a direction of the pulsed light within an area, wherein the area comprises a position of the object.

20. A method of determining a distance to an object based on at least first reflected light provided by a reflection of first pulsed light on the object and second reflected light provided by a reflection of a second pulsed light on the object, comprising:
receiving an electrical signal indicating an intensity of reception light;
specifying, based on the electrical signal, a first duration from when the first pulsed light is emitted until when the first reflected light is received within a first measurement range;
determining, based on the first duration, a second measurement range of the second reflected light;
specifying, within the second measurement range based on the electrical signal, a second duration from when the second pulsed light is emitted until when the second reflected light is received within the second measurement range;
determining the distance from the electronic apparatus to the object according to the second duration;
determining the second measurement range shorter than the first duration;
estimating first intensity of a light which does not include the second reflected light among the reception lights based on the electrical signal;
determining a first threshold value for determining whether or not the reception light includes the second reflected light on a basis of the first intensity and a specific value; and
determining the second reflected light on a basis of the first threshold value to measure the second duration.

21. An electronic apparatus that determines a distance to an object, comprising:
a light source that emits first pulsed light to the object and emits second pulsed light to the object after the emission of the first pulsed light;
a light receiver that receives light and outputs an electrical signal indicating an intensity of reception light; and
processing circuitry configured to:
specify, based on the electrical signal, a first duration from when the first pulsed light is emitted until when the first reflected light is received within a first measurement range;
determine, based on the first duration, a second measurement range of the second reflected light;
specify, within the second measurement range based on the electrical signal, a second duration from when the second pulsed light is emitted until when the second reflected light is received within the second measurement range;
determine the distance from the electronic apparatus to the object according to the second duration;
determine the second measurement range shorter than the first duration;

estimate first intensity of a light which does not include the second reflected light among the reception lights based on the electrical signal;

determine a first threshold value for determining whether or not the reception light includes the second reflected light on a basis of the first intensity and a specific value; and determine the second reflected light on a basis of the first threshold value to measure the second duration.

22. A method of measuring a distance from an object, comprising:

emitting a first pulse light from a light source to the object and emitting a second pulse light to the object after emitting the first pulse light;

receiving a light by a light receiver to output an electrical signal indicating an intensity of the reception light;

based on a first time from when the first pulse light is emitted until when a first reflected signal provided by a reflection of the first pulse light on the object is received by the light receiver and a time range during which the light receiver receives a second reflected signal provided by a reflection of the second pulse light on the object, measuring a second time from when the second pulse light is emitted and until when the light receiver receives the second reflected light provided by the reflection of the second pulse signal on the object, the time range being shorter than the first time;

calculating a distance to the object based on the second time;

based on the electrical signal, estimating a first intensity of a light which does not include the second reflected light among the lights received by the light receiver; and at a time of measuring the second time, determining a first threshold value for determining whether or not the reception light includes the second reflected light based on the first intensity and a predetermined value, and determining the second reflected light based on the first threshold value.

* * * * *